(12) United States Patent
Nakashima

(10) Patent No.: US 8,527,784 B2
(45) Date of Patent: Sep. 3, 2013

(54) INFORMATION PROCESSING APPARATUS, POWER SUPPLY CONTROL METHOD, PROGRAM AND POWER SUPPLY CONTROL SYSTEM TO DEFINE PROCESSING DEPENDING ON TYPES OF POWER SUPPLY APPARATUS CONNECTED

(75) Inventor: Ryoichi Nakashima, Tokyo (JP)

(73) Assignee: Sony Corporation, Tokyo (JP)

( * ) Notice: Subject to any disclaimer, the term of this patent is extended or adjusted under 35 U.S.C. 154(b) by 413 days.

(21) Appl. No.: 12/912,060

(22) Filed: Oct. 26, 2010

(65) Prior Publication Data

US 2011/0107120 A1 May 5, 2011

(30) Foreign Application Priority Data

Nov. 2, 2009 (JP) ................. 2009-252208

(51) Int. Cl.
*G06F 1/00* (2006.01)
*G06F 1/26* (2006.01)
*H02J 7/00* (2006.01)

(52) U.S. Cl.
USPC ............................ 713/300; 713/320; 320/106

(58) Field of Classification Search
USPC ................................ 713/300, 320
See application file for complete search history.

(56) References Cited

U.S. PATENT DOCUMENTS

| 5,420,496 | A | * | 5/1995 | Ishikawa ........................ 320/106 |
| 5,838,793 | A | | 11/1998 | Lewis |
| 7,075,270 | B1 | * | 7/2006 | Blum ............................. 320/114 |
| 7,402,979 | B1 | * | 7/2008 | Blum ............................. 320/112 |
| 7,602,979 | B2 | * | 10/2009 | Yamaguchi ..................... 382/235 |
| 8,150,539 | B2 | * | 4/2012 | Numano ......................... 700/22 |
| 2007/0005197 | A1 | | 1/2007 | Ito et al. |
| 2007/0145945 | A1 | | 6/2007 | McGinley et al. |
| 2009/0256717 | A1 | | 10/2009 | Iwai |
| 2011/0102136 | A1 | | 5/2011 | Nakashima |

FOREIGN PATENT DOCUMENTS

| JP | 11275768 A | * | 10/1999 |
| JP | 2007-109465 A | | 4/2007 |

OTHER PUBLICATIONS

U.S. Appl. No. 12/911,980, filed Oct. 26, 2010, Nakashima.

* cited by examiner

*Primary Examiner* — Suresh Suryawanshi
(74) *Attorney, Agent, or Firm* — Wolf, Greenfield & Sacks, P.C.

(57) ABSTRACT

There is provided an information processing apparatus including a first connection unit with power supply type information, a second connection unit with power supply type information, a connection state determination unit for determining whether the connection states of the first and second connection units have changed, a power supply identification information acquisition unit for selectively acquiring the power supply type information from the first power supply apparatus and from the second power supply apparatus if the connection state determination unit determines that the connection states have changed, a power supply identification information management unit for managing connected-power-supply identification information, and a power supply control unit for controlling a feed from the power supply apparatuses connected to the first and second connection units and a charge on the first power supply apparatus connected to the first connection unit.

7 Claims, 11 Drawing Sheets

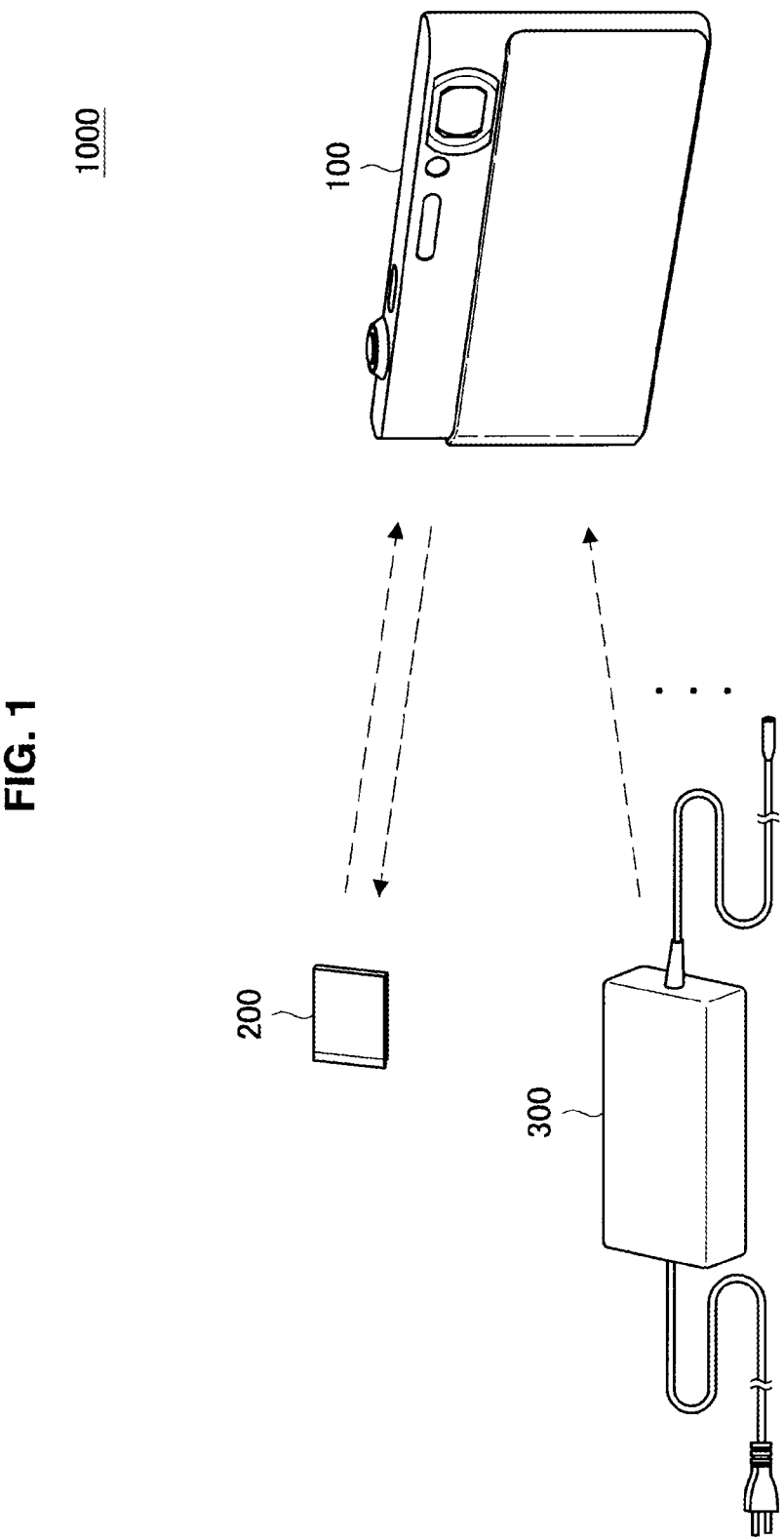

FIG. 2

| A: FEEDING CONNECTOR (FIRST CONNECTION UNIT) | B: BATTERY FOLDER (SECOND CONNECTION UNIT) | C: FEEDING | D: CHARGING SET ON | D: CHARGING SET OFF | D: CHARGING REMARKS |
|---|---|---|---|---|---|
| X | X | X | X | X | |
| X | PRIMARY BATTERY | PRIMARY BATTERY | X | X | |
| X | SECONDARY BATTERY | SECONDARY BATTERY | X | X | |
| AC ADAPTER | X | AC ADAPTER | X | X | |
| AC ADAPTER | PRIMARY BATTERY | AC ADAPTER AND/OR PRIMARY BATTERY | X | X | |
| AC ADAPTER | SECONDARY BATTERY | AC ADAPTER AND/OR SECONDARY BATTERY | O | O | INTERMITTENTLY CHARGEABLE |
| EXTERNAL BATTERY | X | EXTERNAL BATTERY | X | X | |
| EXTERNAL BATTERY | PRIMARY BATTERY | EXTERNAL BATTERY AND/OR PRIMARY BATTERY | X | X | |
| EXTERNAL BATTERY | SECONDARY BATTERY | EXTERNAL BATTERY AND/OR SECONDARY BATTERY | O | O | INTERMITTENTLY CHARGEABLE |
| HAND GENERATOR | X | X | X | X | |
| HAND GENERATOR | PRIMARY BATTERY | HAND GENERATOR AND/OR PRIMARY BATTERY | X | X | |
| HAND GENERATOR | SECONDARY BATTERY | HAND GENERATOR AND/OR SECONDARY BATTERY | O | O | INTERMITTENTLY CHARGEABLE |
| SOLAR CELL UNIT | X | X | X | X | |
| SOLAR CELL UNIT | PRIMARY BATTERY | SOLAR CELL AND PRIMARY BATTERY | X | X | |
| SOLAR CELL UNIT | SECONDARY BATTERY | SOLAR CELL AND SECONDARY BATTERY | O | O | INTERMITTENTLY CHARGEABLE |
| SOLAR CELL UNIT | X | X | X | X | |
| SOLAR CELL UNIT | PRIMARY BATTERY | PRIMARY BATTERY | X | X | |
| SOLAR CELL UNIT | SECONDARY BATTERY | SECONDARY BATTERY | O | O | CHARGED FOR FIXED TIME AT CONSTANT CURRENT |

| ID | MAXIMUM CHARGING CURRENT |
|---|---|
| 11h | 1200mA |
| 12h | 800mA |
| 13h | 500mA |

F → 11h / 1200mA

| ID | MAXIMUM FEEDING CURRENT |
|---|---|
| 01h | 1600mA |
| 02h | 1000mA |
| 03h | 800mA |

G → 02h / 1000mA

| ID | MAXIMUM CHARGING CURRENT |
|---|---|
| 11h | 1200mA |
| 12h | 800mA |
| 13h | 500mA |
| 14h | VARIABLE |

INFORMATION PROCESSING APPARATUS, POWER SUPPLY CONTROL METHOD, PROGRAM AND POWER SUPPLY CONTROL SYSTEM TO DEFINE PROCESSING DEPENDING ON TYPES OF POWER SUPPLY APPARATUS CONNECTED

BACKGROUND OF THE INVENTION

1. Field of the Invention

The present invention relates to an information processing apparatus, a power supply control method, a program, and a power supply control system.

2. Description of the Related Art

In recent years, information processing apparatuses such as notebook-type PCs (personal computers) and digital cameras, which can be connected to a power supply apparatus capable of feeding and being charged such as a battery and a power supply apparatus capable of feeding such as an AC (Alternating Current) adapter, are in widespread use. When, for example, both a battery and an AC adapter are connected, an information processing apparatus like the above one can be fed by both, or can be fed by the AC adapter and can charge the battery.

In the meantime, a technology to control power supply based on the type of the power supply apparatus connected to an information processing apparatus has been developed. For example, Japanese Patent Application Laid-Open No. 2007-109465 can be cited as a technology that makes a determination about identification information held by a battery unit and also makes a determination whether the battery unit satisfies predetermined conditions to disable the battery unit depending on determination results.

SUMMARY OF THE INVENTION

If predetermined conditions are not satisfied by a battery unit (corresponding to a power supply apparatus), an information processing apparatus (hereinafter, referred to as a "information processing apparatus in the related art") using existing technology that controls the power supply (hereinafter, referred to as "existing technology") based on the type of the connected power supply apparatus disables the battery unit. Thus, when the existing technology is used, a so-called modified battery unit can be made not to substantially function even if the modified battery unit is connected to the information processing apparatus and thus, only authorized battery units can be made available.

However, the existing technology only enables the battery unit selectively based on the determination about identification information held by the battery unit and the determination whether the battery unit satisfies predetermined conditions. That is, even if the existing technology is used, a power supply apparatus connected to an information processing apparatus is simply enabled or disabled. Thus, even if the existing technology is used, it is possible to realize of feeding from connected power supply apparatuses based on a combination of power supply apparatuses connected to the information processing apparatus in accordance with the combination or charging to connected power supply apparatuses in accordance with the combination.

In light of the foregoing, it is desirable to provide an information processing apparatus, a power supply control method, a program, and a power supply control system, which are novel and improved, and which are capable of exercising power supply control based on the type of a connected power supply apparatus.

According to an embodiment of the present invention, there is provided an information processing apparatus including a first connection unit connectable to a first power supply apparatus capable of feeding power or of feeding power and charging, the first power supply apparatus storing power supply type information that indicates a type of the first power supply apparatus, a second connection unit connectable to a second power supply apparatus capable of feeding power, the second power supply apparatus storing power supply type information that indicates a type of the second power supply apparatus, a connection state determination unit for determining, based on a connection state of the first connection unit to the first power supply apparatus and a connection state of the second connection unit to the second power supply apparatus, whether the connection states of the first and second connection units have changed, a power supply identification information acquisition unit for selectively acquiring the power supply type information from the first power supply apparatus connected to the first connection unit and from the second power supply apparatus connected to the second connection unit if the connection state determination unit determines that the connection states have changed, a power supply identification information management unit for managing, based on a determination result from the connection state determination unit and power supply type information selectively acquired by the power supply identification information acquisition unit, connected-power-supply identification information that indicates the type of the first power supply apparatus connected to the first connection unit and/or the type of the second power supply apparatus connected to the second connection unit, and a power supply control unit for controlling, based on the connected-power-supply identification information and power supply control information that defines processing depending on the types of the power supply apparatuses connected to the first and second connection units, a feed from the power supply apparatuses connected to the first and second connection units and a charge on the first power supply apparatus connected to the first connection unit.

With such configuration, power supply control based on the type of a connected power supply apparatus can be exercised.

The power supply control information may include information about a maximum charging current of the first power supply apparatus and information about a maximum feeding current of the second power supply apparatus. When the connected-power-supply identification information indicates that both the first and second power supply apparatuses are connected, the power supply control unit may charge the first power supply apparatus with a current having a upper limit value set to lower one of a maximum charging current value indicated in the information about the maximum charging current corresponding to the connected power supply identification information and a maximum feeding current value indicated in the information about the maximum feeding current corresponding to the connected power supply identification information.

When the information, which is included in the power supply control information, about the maximum charging current of the first power supply apparatus corresponding to the connected power supply identification information indicates that the maximum charging current value is variable, the power supply control unit may periodically or non-periodically acquire the information about the maximum charging current from the first power supply apparatus connected to the first connection unit and may charge the first power supply apparatus with a current having a upper limit value set to lower one of a maximum charging current value indicated in the acquired information about the maximum charging current and the maximum feeding current value indicated in the information about the maximum feeding current corresponding to the connected power supply identification information.

The information processing apparatus may further include an operating state determination unit for determining an operating state of the information processing apparatus. The power supply control unit may control, based further on the determination result from the operating state determination unit, the feed from the power supply apparatuses connected to the first and second connection units and the charge on the first power supply apparatus connected to the first connection unit.

According to another embodiment of the present invention, there is provided a power supply control method including the steps of determining, based on a connection state of a first connection unit to a first power supply apparatus and a connection state of a second connection unit to a second power supply apparatus, whether the connection states of the first and second connection units have changed, the first connection unit being connectable to the first power supply apparatus capable of feeding power or of feeding power and charging, the first power supply apparatus storing power supply type information that indicates a type of the first power supply apparatus, the second connection unit being connectable to the second power supply apparatus capable of feeding power, the second power supply apparatus storing power supply type information that indicates a type of the second power supply apparatus, selectively acquiring the power supply type information from the first power supply apparatus connected to the first connection unit and from the second power supply apparatus connected to the second connection unit if the connection states are determined, in the step of determining, to have changed, managing, based on a determination result from the step of determining and power supply type information selectively acquired in the step of acquiring, connected-power-supply identification information that indicates the type of the first power supply apparatus connected to the first connection unit and/or the type of the second power supply apparatus connected to the second connection unit, and controlling, based on the connected-power-supply identification information and power supply control information that defines processing depending on the types of the power supply apparatuses connected to the first and second connection units, a feed from the power supply apparatuses connected to the first and second connection units and a charge on the first power supply apparatus connected to the first connection unit.

By use of such a method, power supply control based on the type of a connected power supply apparatus can be exercised.

According to another embodiment of the present invention, there is provided a program for causing a computer to execute the steps of, determining, based on a connection state of a first connection unit to a first power supply apparatus and a connection state of a second connection unit to a second power supply apparatus, whether the connection states of the first and second connection units have changed, the first connection unit being connectable to the first power supply apparatus capable of feeding power or of feeding power and charging, the first power supply apparatus storing power supply type information that indicates a type of the first power supply apparatus, the second connection unit being connectable to the second power supply apparatus capable of feeding power, the second power supply apparatus storing power supply type information that indicates a type of the second power supply apparatus, selectively acquiring the power supply type information from the first power supply apparatus connected to the first connection unit and from the second power supply apparatus connected to the second connection unit if the connection states are determined, in the step of determining, to have changed, managing, based on a determination result from the step of determining and power supply type information selectively acquired in the step of acquiring, connected-power-supply identification information that indicates the type of the first power supply apparatus connected to the first connection unit and/or the type of the second power supply apparatus connected to the second connection unit, and controlling, based on the connected-power-supply identification information and power supply control information that defines processing depending on the types of the power supply apparatuses connected to the first and second connection units, a feed from the power supply apparatuses connected to the first and second connection units and a charge on the first power supply apparatus connected to the first connection unit.

By use of such a program, power supply control based on the type of a connected power supply apparatus can be exercised.

According to another embodiment of the present invention, there is provided a power supply control system including, a first power supply apparatus capable of feeding power or of feeding power and charging, storing power supply type information that indicates a type of the first power supply apparatus, a second power supply apparatus capable of feeding power, storing power supply type information that indicates a type of the second power supply apparatus, and an information processing apparatus connectable to the first power supply apparatus and/or the second power supply apparatus for controlling a feed from the connected first and/or second power supply apparatus and a charge on the first power supply apparatus. The information processing apparatus may include a first connection unit connected to the first power supply apparatus, a second connection unit connected to the second power supply apparatus, a connection state determination unit for determining, based on a connection state of the first connection unit to the first power supply apparatus and a connection state of the second connection unit to the second power supply apparatus, whether the connection states of the first and second connection units have changed, a power supply identification information acquisition unit for selectively acquiring the power supply type information from the first power supply apparatus connected to the first connection unit and from the second power supply apparatus connected to the second connection unit if the connection state determination unit determines that the connection states have changed, a power supply identification information management unit for managing, based on a determination result from the connection state determination unit and power supply type information selectively acquired by the power supply identification information acquisition unit, connected-power-supply identification information that indicates the type of the first power supply apparatus connected to the first connection unit and/or the type of the second power supply apparatus connected to the second connection unit, and a power supply control unit for controlling, based on the connected-power-supply identification information and power supply control information that defines processing depending on the types of the power supply apparatuses connected to the first and second connection units, a feed from the power supply apparatuses connected to the first and second connection units and a charge on the first power supply apparatus connected to the first connection unit.

With such configuration, a power supply control system capable of exercising power supply control based on the type of a connected power supply apparatus can be provided.

According to the present invention, power supply control based on the type of a connected power supply apparatus can be exercised.

BRIEF DESCRIPTION OF THE DRAWINGS

FIG. 1 is an explanatory view showing an overview of a power supply control system according to an embodiment of the present invention;

FIG. 2 is an explanatory view showing an example of power supply control information according to the embodiment of the present invention;

DETAILED DESCRIPTION OF THE EMBODIMENT

Figures 3, 4, 5:
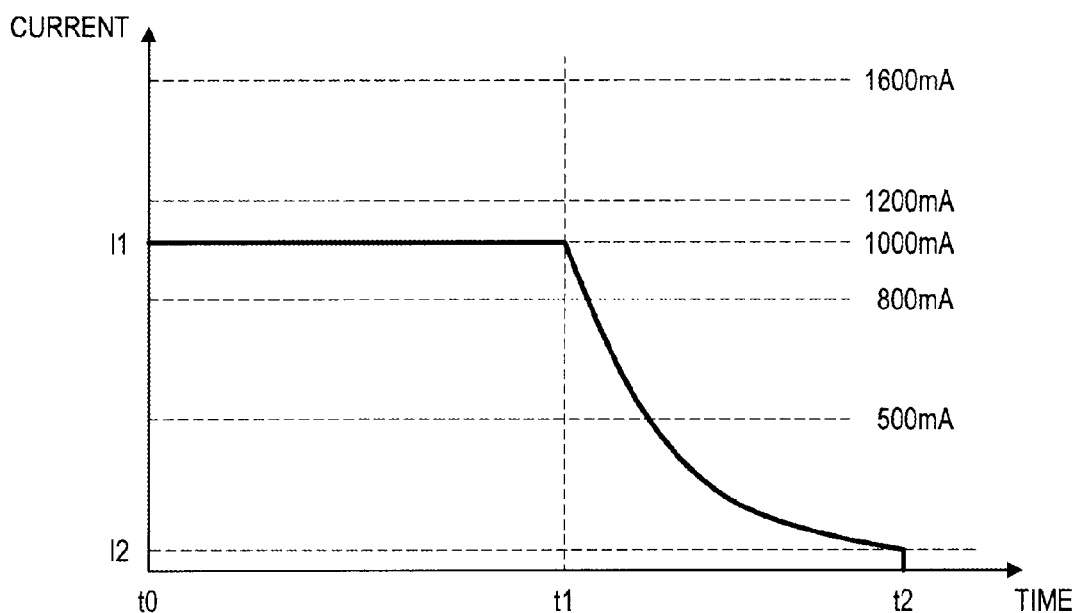
FIG. 3 is an explanatory view showing an example of information about power supply apparatuses to be controlled contained in the power supply control information according to the embodiment of the present invention.
FIG. 4 is an explanatory view showing an example of information about power supply apparatuses to be controlled contained in the power supply control information according to the embodiment of the present invention.
FIG. 5 is an explanatory view showing a first example of charging control to a first power supply apparatus in an information processing apparatus according to the embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The present invention will be described below in the following order:

1. Approach according to an embodiment of the present invention

2. Power supply control system according to an embodiment of the present invention 3. Program according to an embodiment of the present invention (Approach According to an Embodiment of the Present Invention)

Before describing the configuration of each apparatus constituting a power supply control system (hereinafter, referred to as a "power supply control system 1000") according to an embodiment of the present invention, a power supply control approach according to an embodiment of the present invention will be described.

[Overview of the Power Supply Control System 1000]

FIG. 1 is an explanatory view showing an overview of a power supply control system 1000 according to an embodiment of the present invention. The power supply control system 1000 includes an information processing apparatus 100, a first power supply apparatus 200, and a second power supply apparatus 300.

The information processing apparatus 100 is connected to the first power supply apparatus 200 and/or the second power supply apparatus 300 and is driven by receiving power from the connected power supply apparatus (or apparatuses) to perform various kinds of processing. In the power supply control system 1000, the information processing apparatus 100 plays a leading role in performing processing concerning the power supply control approach according to the embodiment of the present invention described later. In FIG. 1, a digital camera is shown as the information processing apparatus 100, but the present invention is not limited to the above example.

The first power supply apparatus 200 is a power supply apparatus that stores power supply type information and is capable of feeding power or of feeding power and charging. When connected to the information processing apparatus 100, the first power supply apparatus 200 supplies power to the information processing apparatus 100 and also charging is performed with a charging current controlled by the information processing apparatus 100 (if feeding and charging are possible). Alternatively, when connected to the information processing apparatus 100, the first power supply apparatus 200 supplies power to the information processing apparatus 100 (if feeding is possible).

The power supply type information according to the embodiment of the present invention is information showing the type of the power supply. By acquiring the power supply type information from a power supply apparatus, the information processing apparatus 100 can identify what power supply apparatuses are connected. For example, identification information (for example, ID) indicating the classification of the power supply apparatus such as the secondary battery, primary battery, and AC adapter can be cited as the power supply type information, but the present invention is not limited to the above examples. For example, the power supply type information according to the embodiment of the present invention may be identification information specific to each model of the power supply apparatus. Examples in which the power supply type information is identification information specific to each model of the power supply apparatus include allocation of other identification information depending on whether "the secondary battery is a lithium ion alloy secondary battery or a lithium ion polymer secondary battery" or "the AC adapter is for 4.2 [V] output or 8.4 [V] output". Alternatively, other identification information may be allocated as the power supply type information depending on whether, for example, the secondary battery is a single-cell secondary battery, a secondary battery in which two cells are connected in series, or a secondary battery in which two cells are connected in parallel.

If, as described above, the power supply type information is identification information specific to each model of the power supply apparatus, the power supply type information can further be classified by classifying power supply apparatuses included in one class of the power supply apparatus based on, for example, the maximum receivable current and the maximum supply current.

As the first power supply apparatus 200, for example, a secondary battery such as a lithium ion secondary battery or a lithium ion polymer secondary battery can be cited, but the present invention is not limited to the above example. For example, the first power supply apparatus 200 may be a primary battery.

The second power supply apparatus 300 is a power supply apparatus that stores power supply type information and is capable of feeding power. When connected to the information processing apparatus 100, the second power supply apparatus 300 supplies power to the information processing apparatus 100.

As the second power supply apparatus 300, for example, an AC adapter, solar cell, fuel cell, external battery (for example, an external primary battery or secondary battery), and hand generator can be cited, but the present invention is not limited to the above examples.

In the power supply control system 1000, as shown in, for example, FIG. 1, the first power supply apparatus 200 and/or the second power supply apparatus 300 is selectively connected to the information processing apparatus 100 to supply power to the information processing apparatus 100 or to charge the first power supply apparatus 200.

FIG. 1 shows a configuration in which the power supply control system 1000 has two power supply apparatuses, but a power supply control system of the present invention is not limited to the above example. For example, the power supply control system of the present invention may have a plurality of (three or more) power supply apparatuses connected to the information processing apparatus 100. Also in this configuration, a power supply control system according to the embodiment of the present invention can exercise power supply control of power supply apparatuses to which the information processing apparatus 100 is connected through the power supply control approach described later.

[Overview of the Power Supply Control Approach]

An overview of the power supply control approach according to an embodiment of the present invention will be described. The following description will be provided by mainly exemplifying a power supply control system according to an embodiment of the present invention in which, as shown in FIG. 1, two power supply apparatuses, i.e., the first power supply apparatus 200 and the second power supply apparatus 300, can be connected to the information processing apparatus 100. The first power supply apparatus 200 and the second power supply apparatus 300 that can be connected to the information processing apparatus 100 may collectively be called "power supply apparatuses" below.

As described above, an information processing apparatus in the related art using existing technology simply enables or disables connected power supply apparatuses. Thus, even if the existing technology is used, it is difficult to supply power from a connected power supply apparatus in accordance with a combination of power supply apparatuses connected to the information processing apparatus or to charge a connected power supply apparatus in accordance with the combination.

In the power supply control system 1000, the information processing apparatus 100 exercises power supply control for connected power supply apparatuses in accordance with a combination of connected power supply apparatuses based on the combination of connected power supply apparatuses. With the above control, the information processing apparatus 100 can control, in accordance with the combination of connected power supply apparatuses, feeding power from the connected first power supply apparatus 200 and/or second power supply apparatus 300 and charging the connected first power supply apparatus 200.

More specifically, the information processing apparatus 100 realizes power supply control in accordance with the combination of connected power supply apparatuses by performing, for example, processing in (1) to processing in (4) below. The processing in (1) to the processing in (4) described below can be considered as an example of a power supply control method according to an embodiment of the present invention.

(1) Change Determination Processing of the Connection State

The information processing apparatus 100 detects the connection state of the first power supply apparatus 200 to a first connection unit to which the first power supply apparatus 200 is connected and the connection state of the second power supply apparatus 300 to a second connection unit to which the second power supply apparatus 300 is connected. Then, the information processing apparatus 100 determines the presence/absence of changes in connection states of the power supply apparatuses based on detection results.

The connection state in the first connection unit and that in the second connection unit can be detected according the method described below. It is needless to say that the detection method of the connection state by the information processing apparatus 100 according to an embodiment of the present invention is not limited to the method below. The first connection unit and the second connection unit provided in the information processing apparatus 100 may collectively be called "connection units".

[Examples of the Detection Method of the Connection State]
- Detection based on ON (connected state)/OFF (non-connected state) of a mechanical switch installed in the connection unit
- Detection based on a signal level of a signal line. For example, when a power supply apparatus is connected to the connection unit, a change of the connection state is detected because the signal level changes from High to Low after the signal line of the High level is brought into contact with a Low terminal.
- Detection based on whether a measurement result is equal to or greater than a reference value after the level of an UNREG voltage supplied from a power supply apparatus is measured by an AD converter (Analog o Digital converter).

The information processing apparatus 100 detects the connection state of each of the first connection unit and the second connection unit by using, for example, one of the above detection methods to determine changes of the connection state of the connection units. For example, by determining changes of the connection state of the connection units as described above, the information processing apparatus 100 can detect insertion/removal of power supply apparatuses.

(2) Acquisition Processing of Power Supply Type Information

Based on a determination result of the processing in (1), the information processing apparatus 100 selectively acquires power supply type information from connected power supply apparatuses. More specifically, the information processing apparatus 100 acquires power supply type information from connected power supply apparatuses when the processing in (1) determines that the connection state has changed.

The information processing apparatus 100 directly acquires power supply type information from power supply apparatuses connected to the connection units by, for example, transmitting a power supply type information transmission instruction requesting transmission of the power supply type information to power supply apparatuses via the connection units, but the acquisition method is not limited to the above example. For example, the information processing apparatus 100 sequentially transmits power supply type information (for example, ID) corresponding to power supply apparatuses to be controlled via the connection units and, if a response is received from a power supply apparatus, sets the power supply type information corresponding to the response as the power supply type information of the connected power supply apparatus (indirect acquisition of power supply type information). When, like the above case, power supply type information is indirectly acquired, the information processing apparatus 100 can, for example, reduce the communication time or amount of communication by transmitting only power supply type information recorded in power supply control information described below and corresponding to the power supply apparatuses to be controlled.

(3) Management Processing of Connected Power Supply Identification Information

Based on a determination result of the processing in (1) and power supply type information selectively acquired by the processing in (2), the information processing apparatus 100 manages connected power supply identification information indicating the type of the power supply apparatus (apparatuses) connected to the first connection unit and/or the second connection unit.

More specifically, the information processing apparatus 100 does not update connected power supply identification information when the processing in (1) does not determine that the connection state has changed.

When the processing in (1) determines that the connection state has changed, the information processing apparatus 100 updates connected power supply identification information based on the power supply type information acquired by the processing in (2). As an update method of connected power supply identification information by the information processing apparatus 100, for example, deleting stored connected power supply identification information and then, storing new connected power supply identification information based on the acquired power supply type information can be cited, but the update method is not limited to the above example.

The information processing apparatus 100 stores the acquired power supply type information itself as connected power supply identification information, but the present invention is not limited to the above example. For example, the information processing apparatus 100 can store the acquired power supply type information as one piece of connected power supply identification information by recording the acquired power supply type information in one file. In any of the above cases, the information processing apparatus 100 can uniquely identify the type of the power supply apparatus connected to the connection unit by referring to the stored connected power supply identification information. The connected power supply identification information may be in any format as long as the information processing apparatus 100 can uniquely identify the type of the power supply apparatus connected to the connection unit by referring to the connected power supply identification information.

(4) Power Supply Control Processing

Based on connected power supply identification information and power supply control information, the information processing apparatus 100 controls feeding from power supply apparatuses connected to the first connection unit and the second connection unit and charging to the first power supply apparatus connected to the first connection unit.

The power supply control information according to an embodiment of the present invention is information that defines processing in accordance with the type of power supply apparatuses connected to the first connection unit and the second connection unit. The power supply control information according to the embodiment of the present invention may further contain, for example, information about power supply apparatuses to be controlled such as information about the maximum charging current of the first power supply apparatus 200, information about the maximum feeding current of the second power supply apparatus 300, and information about the maximum feeding current of the first power supply apparatus 200.

FIG. 2 is an explanatory view showing an example of power supply control information according to the embodiment of the present invention. FIGS. 3 and 4 are explanatory views showing examples of information about power supply apparatuses to be controlled contained in the power supply control information according to the embodiment of the present invention. Here, FIG. 3 shows an example of information about the maximum charging current of the first power supply apparatus 200 and FIG. 4 shows an example of information about the maximum feeding current of the second power supply apparatus 300. FIGS. 3 and 4 show a case where IDs (an example of power supply identification information) indicating power supply apparatuses are represented by hexadecimal numbers, but the present invention is not limited to the above example.

As shown in FIG. 2, the power supply control information according to the embodiment of the present invention defines processing related to feeding (C in FIG. 2) and processing related to charging (D in FIG. 2) in accordance with the combination of the type of the second power supply apparatus 300 connected to the first connection unit (A in FIG. 2) and the type of the first power supply apparatus 200 connected to the second connection unit (B in FIG. 2).

"X" shown in A of FIG. 2 and in B of FIG. 2 shows cases where no power supply apparatus is connected or power supply control information is not obtainable (that is, a power supply apparatus not to be controlled is connected). "X" shown in C of FIG. 2 and in D of FIG. 2 indicates that charging or feeding is not carried out and "O" shown in C of FIG. 2 and in D of FIG. 2 indicates that charging or feeding is carried out.

The information processing apparatus 100 can uniquely identify the type of the power supply apparatus connected to the connection unit through connected power supply identification information and thus can exercise power supply control appropriate for the connected power supply apparatus by using power supply control information.

The power supply control information according to the embodiment of the present invention is not limited to the example shown in FIG. 2. In FIG. 2, for example, the type of the connected power supply apparatus is shown by "Power supply apparatus name", but may be shown by ID (for example, an ID group or ID using a wild card such as "0" and "1").

Power supply control information is stored in advance in the information processing apparatus 100 when the information processing apparatus 100 is manufactured, but the storage of power supply control information is not limited to the above example. If, for example, the information processing apparatus 100 has a function to communicate with an external apparatus such as a server, new power supply control information may be acquired from the external apparatus and stored when necessary.

EXAMPLES OF POWER SUPPLY CONTROL

Examples of power supply control by the information processing apparatus 100 according to an embodiment of the present invention will be described. As an example of power supply control by the information processing apparatus 100 according to the embodiment of the present invention, a case where power supply apparatuses connected to the information processing apparatus 100 indicated by the connected power supply identification information are those of the combination indicated by E in FIG. 2 is taken below as an example. Moreover, a case where the information processing apparatus 100 controls charging to the first power supply apparatus 200 and feeding from the second power supply apparatus 300 is taken below as an example.

[1] First Example

The information processing apparatus 100 can, as described above, uniquely identify the connected power supply apparatus based on connected power supply identification information. As a first example of power supply control by the information processing apparatus 100, a case where the identified first power supply apparatus 200 is, as indicated by F in FIG. 3, a power supply apparatus whose maximum charging current is 1200 mA and the identified second power supply apparatus 300 is, as indicated by G in FIG. 4, a power supply apparatus whose maximum feeding current is 1000 mA is taken below as an example.

FIG. 5 is an explanatory view showing the first example of charging control to the first power supply apparatus 200 in the information processing apparatus 100 according to the embodiment of the present invention. Here, FIG. 5 shows an example of charging control when the first power supply apparatus 200 is a lithium ion secondary battery.

If the first power supply apparatus 200 is a lithium ion secondary battery, for example, constant current charging is carried out when the normal voltage is low (corresponding to the t0-t1 period in FIG. 5) and constant voltage charging is carried out when the voltage rises due to charging (corresponding to the t1-t2 period in FIG. 5). Switching from constant current charging to constant voltage charging occurs when the charging current during constant current charging and that during constant voltage charging become equal.

When constant current charging is carried out, the information processing apparatus 100 charges the first power supply apparatus 200 by setting the lower current value of the maximum charging current value indicated by information about the maximum charging current of the connected first power supply apparatus 200 and the maximum feeding current value indicated by information about the maximum feeding current of the connected second power supply apparatus 300 as an upper limit If, like the first example, the maximum charging current value of the connected first power supply apparatus 200 is 1200 mA and the maximum feeding current value of the connected second power supply apparatus 300 is 1000 mA, the information processing apparatus 100 charges the first power supply apparatus 200 at 1000 mA set as the upper limit.

If the information processing apparatus 100 exercises charging control to the first power supply apparatus 200 as shown in, for example, FIG. 5, the first power supply apparatus 200 can be charged at the maximum chargeable current value without exceeding the maximum charging current value of the first power supply apparatus 200. Therefore, the information processing apparatus 100 can charge the first power supply apparatus 200 safely in the shortest time by exercising charging control to the first power supply apparatus 200 as shown in, for example, FIG. 5.

[2] Second Example

As the first example of power supply control by the information processing apparatus 100, an example of charging control when the maximum charging current value of the first power supply apparatus 200 to be charged is defined as a constant value has been described above.

For example, the maximum chargeable current value of secondary battery cells changes depending on the temperature and the degree of degradation. Moreover, for example, a secondary battery can be charged by a large current at room temperature, but it is not desirable to charge the secondary battery at a large current as the temperature rises in terms of safety because an influence of heat generation by the charging current cannot be ignored. Also, for example, the secondary battery has a larger internal impedance of the battery at low temperature, which makes application of a higher voltage necessary even when the same current is used for charging so that charging by a large current is not desirable in terms of safety. Further, for example, the secondary battery has a larger internal impedance of the battery with an increasing degree of degradation, which makes application of a higher voltage necessary even when the same current is used for charging so that charging by a large current is not desirable in terms of safety. Therefore, the maximum charging current value of each power supply apparatus as shown in FIG. 3 is decided in consideration of, for example, usage of the power supply apparatus at high or low temperature and usage of degraded power supply apparatuses.

However, power supply control by the information processing apparatus 100 according to the embodiment of the present invention is not limited to, like the first example, control when the maximum charging current value of the first power supply apparatus 200 to be controlled is a constant value.

Figures 6, 7:
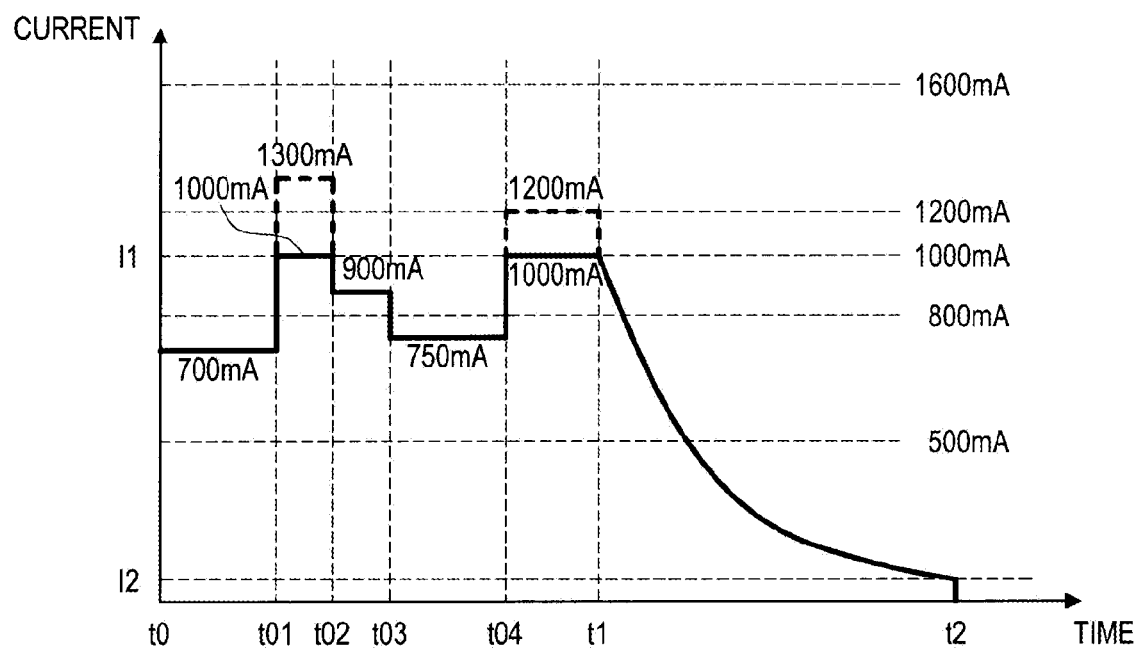
FIG. 6 is an explanatory view showing an example of information about power supply apparatuses to be controlled contained in the power supply control information according to the embodiment of the present invention.
FIG. 7 is an explanatory view showing a second example of charging control to the first power supply apparatus in the information processing apparatus according to the embodiment of the present invention.

FIG. 6 is an explanatory view showing an example of information about power supply apparatuses to be controlled contained in the power supply control information according to the embodiment of the present invention. Here, FIG. 6 shows another example of information about the maximum charging current of the first power supply apparatus 200. Also FIG. 6 shows, like FIGS. 3 and 4, a case where IDs (an example of power supply identification information) indicating power supply apparatuses are represented by hexadecimal numbers.

As a second example of power supply control by the information processing apparatus 100, a case where the identified first power supply apparatus 200 is, as indicated by H in FIG. 6, a power supply apparatus whose maximum charging current is set as variable and the identified second power supply apparatus 300 is, as indicated by G in FIG. 4, a power supply apparatus whose maximum feeding current is 1000 mA is taken below as an example.

If the identified first power supply apparatus 200 is, as indicated by H in FIG. 6, a power supply apparatus whose maximum charging current is set as variable, the information processing apparatus 100 acquires information about the maximum charging current from the first power supply apparatus 200 periodically or non-periodically. As an acquisition method of information about the maximum charging current, for example, the information processing apparatus 100 transmits a maximum charging current information transmission instruction requesting transmission of information about the maximum charging current via the first connection unit to the first power supply apparatus 200 to acquire information about the maximum charging current, but the acquisition method is not limited to the above example.

Then, the information processing apparatus 100 charges the first power supply apparatus 200 by setting the lower current value of the maximum charging current value indicated by information about the acquired maximum charging current and the maximum feeding current value indicated by information about the maximum feeding current of the connected second power supply apparatus 300 as the upper limit.

FIG. 7 is an explanatory view showing the second example of charging control to the first power supply apparatus 200 in the information processing apparatus 100 according to the embodiment of the present invention. Here, FIG. 7 shows, like FIG. 5, an example of charging control when the first power supply apparatus 200 is a lithium ion secondary battery. Charging control to the first power supply apparatus 200 in a constant current charging period (the t0-t1 period in FIG. 7) will be described below.

<a> t0-t01 Period

If the maximum feeding current value indicated by information about the maximum feeding current acquired at t0 is 700 mA, the information processing apparatus 100 charges the first power supply apparatus 200 by setting 700 mA, which is the maximum feeding current value indicated by information about the maximum feeding current, as the upper limit <b> t01-t02 Period If the maximum feeding current value indicated by information about the maximum feeding current acquired at t01 is 1300 mA, the information processing apparatus 100 charges the first power supply apparatus 200 by setting 1000 mA, which is the maximum feeding current, as the upper limit <c> t02-t03 Period If the maximum feeding current value indicated by information about the maximum feeding current acquired at t02 is 900 mA, the information processing apparatus 100 charges the first power supply apparatus 200 by setting 900 mA, which is the maximum feeding current value indicated by information about the maximum feeding current, as the upper limit.

<d> t03-t04 Period

If the maximum feeding current value indicated by information about the maximum feeding current acquired at t03 is 750 mA, the information processing apparatus 100 charges the first power supply apparatus 200 by setting 750 mA, which is the maximum feeding current value indicated by information about the maximum feeding current, as the upper limit.

<e> t0-t01 Period

If the maximum feeding current value indicated by information about the maximum feeding current acquired at t04 is 1200 mA, the information processing apparatus 100 charges the first power supply apparatus 200 by setting 1000 mA, which is the maximum feeding current, as the upper limit.

If the information processing apparatus 100 exercises charging control to the first power supply apparatus 200 as shown in, for example, FIG. 7, the first power supply apparatus 200 can be charged, like the first example of power supply control, at the maximum chargeable current value without exceeding the maximum charging current value of the first power supply apparatus 200. Therefore, the information processing apparatus 100 can charge the first power supply apparatus 200 safely in the shortest time by exercising charging control to the first power supply apparatus 200 as shown in, for example, FIG. 7.

The information processing apparatus 100 controls charging to the first power supply apparatus 200 based on information about the maximum feeding current acquired from the first power supply apparatus 200 when necessary and thus, as shown in, for example, FIG. 7, the first power supply apparatus 200 can be charged at the maximum chargeable current value suitable for each period. Thus, if the information processing apparatus 100 exercises charging control to the first power supply apparatus 200 as shown in, for example, FIG. 7, charging control more efficient in charging in which an influence of usage of the power supply apparatus at high or low temperature and an influence of usage of degraded power supply apparatuses are considered more than in the first example of power supply control can be exercised.

[3] Other Examples

Figure 8:
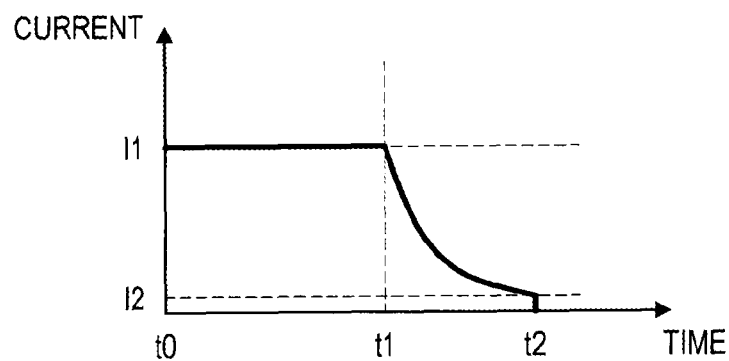
FIG. 8 is an explanatory view showing another example of charging control to the first power supply apparatus in the information processing apparatus according to the embodiment of the present invention.
Figure 9:
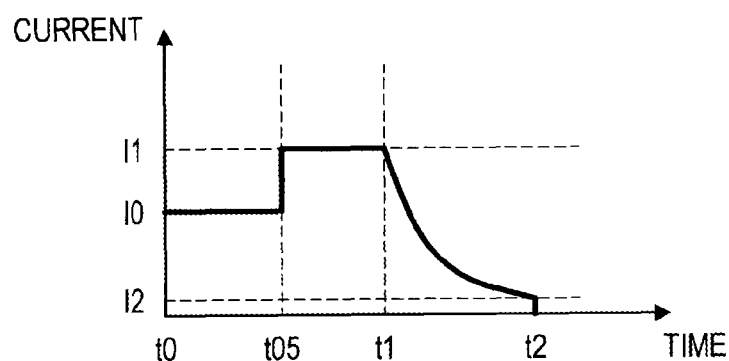
FIG. 9 is an explanatory view showing another example of charging control to the first power supply apparatus in the information processing apparatus according to the embodiment of the present invention.
Figure 10:
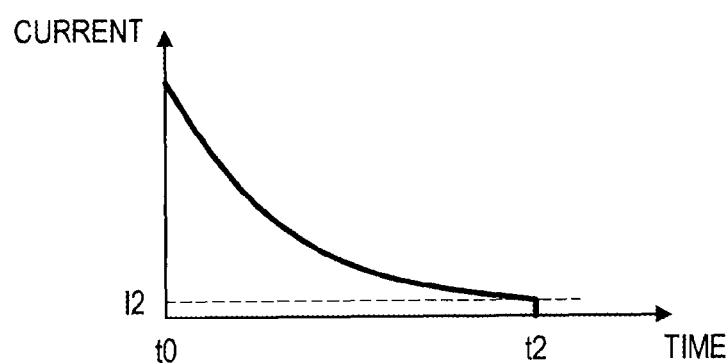
FIG. 10 is an explanatory view showing another example of charging control to the first power supply apparatus in the information processing apparatus according to the embodiment of the present invention.

Power supply control by the information processing apparatus 100 according to the embodiment of the present invention is not limited to the first example and the second example. FIGS. 8 to 10 are explanatory views showing other examples of charging control to the first power supply apparatus in the information processing apparatus according to the embodiment of the present invention. A case where the first power supply apparatus 200 is a lithium ion secondary battery is taken below as an example.

Here, FIGS. 8 and 9 show examples of charging control combining constant current charging and constant voltage charging. FIG. 8 corresponds to the power supply control according to the first example in which the information processing apparatus 100 carries out constant current charging in the t0-t1 period and constant voltage charging in the t1-t2 period. FIG. 10 shows an example in which the information processing apparatus 100 carries out constant voltage charging in the t0-t2 period.

When the power supply control according to the first example shown in FIGS. 5 and 8 is exercised, as described above, the information processing apparatus 100 can charge the first power supply apparatus 200 safely in the shortest time. In power supply control shown in FIG. 9, in contrast to the above, constant current charging in the t0-t1 period is carried out at current value I0 in the t0-t5 period and at current value I1 in the t05-t1 period (I1>I0).

If the first power supply apparatus 200 is a lithium ion secondary battery, the first power supply apparatus 200 has a charging protection FET (Field Effect Transistor) and a discharging protection FET. If the final voltage to operate the charging protection FET and the discharging protection FET is set small, there is a possibility that cells are rapidly degraded if a normal charging current is passed at low voltage when charging is started. Thus, in the above case, the information processing apparatus 100 exercises power supply control as shown in FIG. 9 to prevent rapid degradation of the cells.

If the final voltage to operate the charging protection FET and the discharging protection FET is set large, the charging current is within an allowable range even if constant voltage charging is carried out from the start of charging. Thus, in the above case, the information processing apparatus 100 can exercise power supply control by constant voltage charging as shown in FIG. 10.

The information processing apparatus 100 exercises power supply control as shown in, for example, [1] to [3] described above as the processing in (4).

Power supply control by the information processing apparatus 100 according to the embodiment of the present invention has been described above by focusing on charging to the first power supply apparatus 200, but the power supply control is not limited to the above example. For example, if the connected second power supply apparatus 300 is an AC adapter supporting a plurality of outputs such as 4.2 [V] output and 8.4 [V] output, the information processing apparatus 100 can also control feeding from the second power supply apparatus 300 by transmitting an output control instruction to specify the output voltage to the second power supply apparatus 300.

Also, the foregoing has shown that the information processing apparatus 100 exercises power supply control of a power supply apparatus connected to the connection unit based on connected power supply identification information and power supply control information as the processing in (4), but the power supply control is not limited to the above example. For example, the information processing apparatus 100 determines an operating state of the information processing apparatus 100 so that power supply control of power supply apparatuses connected to the connection units can be exercised based on the determined operating state, connected power supply identification information, and power supply control information.

The operating state used by the information processing apparatus 100 for power supply control includes, as shown in, for example, D of FIG. 2, whether "Set ON" or "Set OFF". Set OFF shown in D of FIG. 2 shows that the information processing apparatus 100 is in a standby state and Set ON shown in D of FIG. 2 corresponds to a state in which the standby state is canceled.

The operating states used by the information processing apparatus 100 according to the embodiment of the present invention for power supply control are not limited to the examples in D of FIG. 2. For example, the information processing apparatus 100 may determine whether the information processing apparatus 100 is in a power saving state in which functions thereof are limited or in a state in which the power saving state is canceled to use the determined state as an operating state used for power supply control.

If the information processing apparatus 100 further exercises power supply control of power supply apparatuses connected to the connection units based on the operating states, as shown in, for example, D of FIG. 2, power supply control can be switched based on the operating states.

The information processing apparatus 100 can realize power supply control in accordance with the combination of connected power supply apparatuses by performing, for example, the processing in (1) to the processing in (4) described above.

[Processing Concerning the Power Supply Control Approach]

Figure 11:
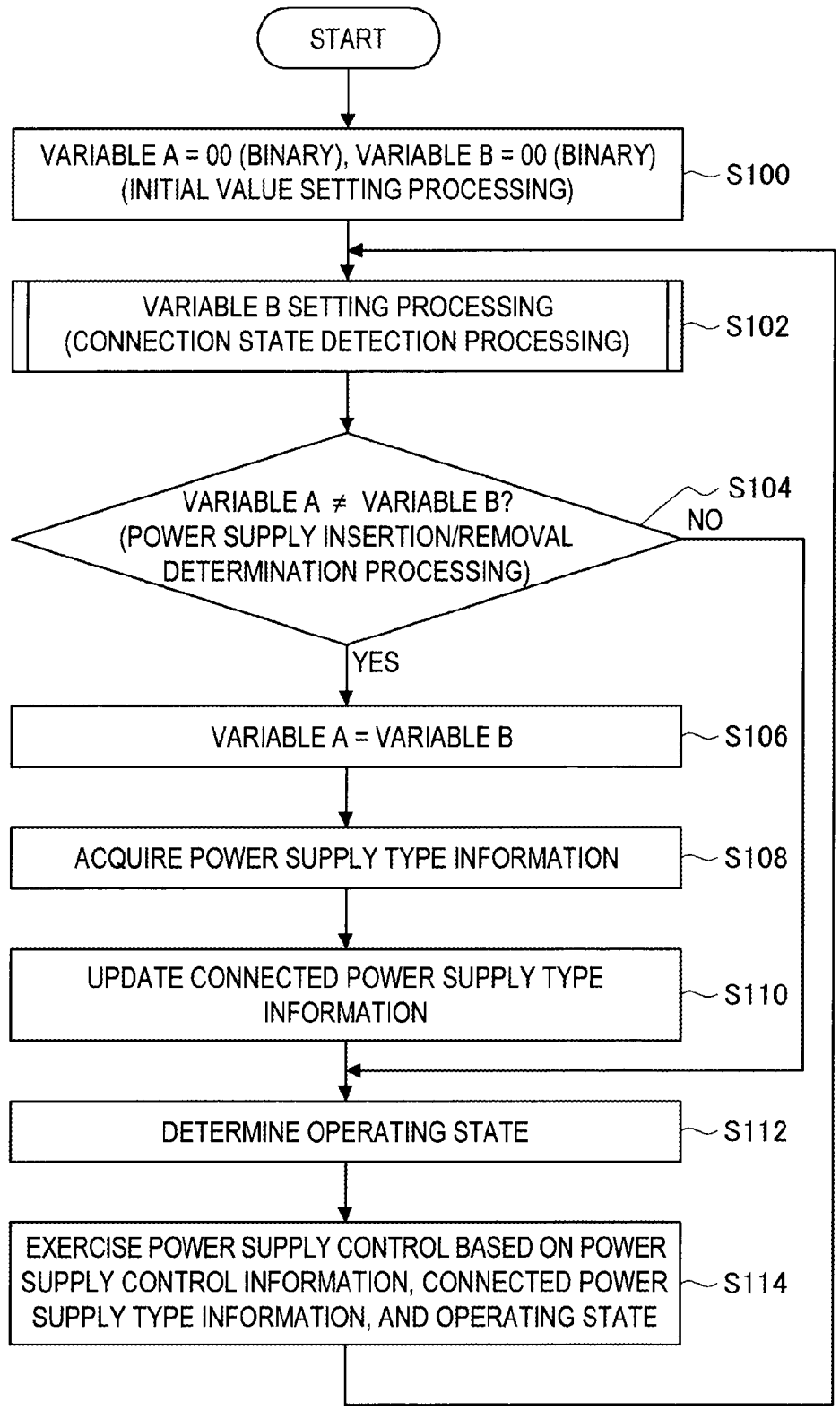
FIG. 11 is a flowchart showing an example of processing concerning power supply control by the information processing apparatus according to the embodiment of the present invention.

Next, processing concerning the power supply control approach by the information processing apparatus 100 will be described more specifically. FIG. 11 is a flowchart showing an example of processing concerning power supply control by the information processing apparatus 100 according to the embodiment of the present invention. Processing when the power supply control system 1000 according to an embodiment of the present invention has, as shown in FIG. 1, two power supply apparatuses, i.e., the first power supply apparatus 200 and the second power supply apparatus 300, connectible to the information processing apparatus 100 is taken as an example.

The information processing apparatus 100 sets a variable A=00 (binary number) and a variable B=00 (binary number) (S100: initial value setting processing). The processing in step S100 is selectively performed when a power supply apparatus is first connected to the information processing apparatus 100, feeding from a power supply apparatus occurs after feeding from the power supply apparatus is stopped, or the initial state is set by a reset operation of the user. The information processing apparatus 100 can determine whether to perform the initial value setting processing related to step S100 by using a flag such as an initial setting flag, but the method of determination is not limited to the above example.

The information processing apparatus 100 performs variable B setting processing (S102). The processing in step S102 corresponds to connection state detection processing to detect the connection state of a power supply apparatus connected to the connection unit.

[Variable B Setting Processing (Connection State Detection Processing)]

Figure 12:
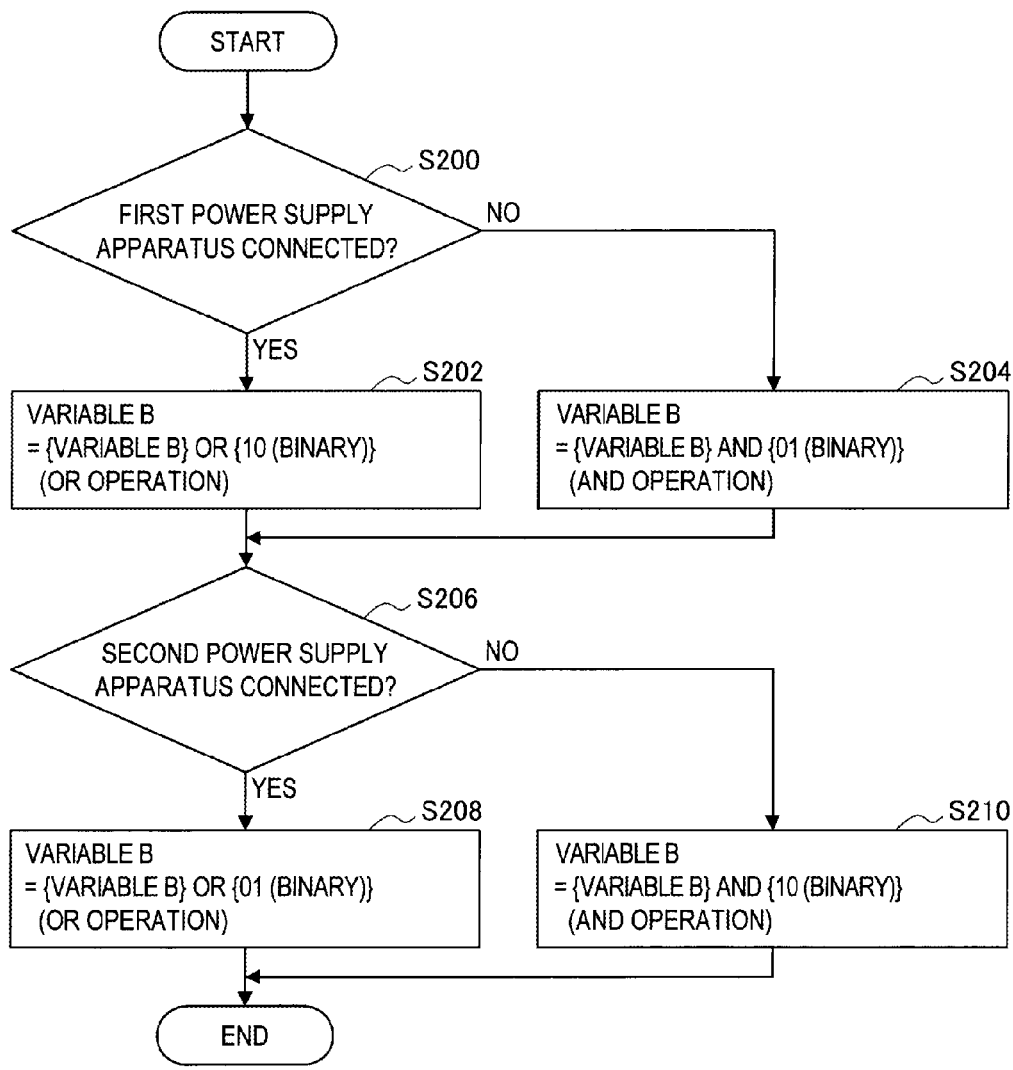
FIG. 12 is a flowchart showing an example of variable B setting processing (connection state detection processing) in the information processing apparatus according to the embodiment of the present invention.

FIG. 12 is a flowchart showing an example of variable B setting processing (connection state detection processing) in the information processing apparatus 100 according to the embodiment of the present invention.

The information processing apparatus 100 determines whether the first power supply apparatus 200 is connected to the first connection unit (S200). Here, the information processing apparatus 100 makes a determination in step S200 by using the above detection method of the connection state such as the mechanical switch installed in the first connection unit.

If a determination is made in step S200 that the first power supply apparatus 200 is connected to the first connection unit, the information processing apparatus 100 performs an operation of "variable B=(variable B) OR (10 (binary number))" (S202).

If a determination is made in step S200 that the first power supply apparatus 200 is not connected to the first connection unit, the information processing apparatus 100 performs an operation of "variable B=(variable B) AND (01 (binary number))" (S204).

When processing in step S202 or processing in step S204 is completed, the information processing apparatus 100 determines whether the second power supply apparatus 300 is connected to the second connection unit (S206). Here, like step S200, the information processing apparatus 100 makes a determination in step S206 by using the above detection method of the connection state such as the mechanical switch installed in the second connection unit.

If a determination is made in step S206 that the second power supply apparatus 300 is connected to the second connection unit, the information processing apparatus 100 performs an operation of "variable B=(variable B) OR (01 (binary number))" (S208).

If a determination is made in step S206 that the second power supply apparatus 300 is not connected to the second connection unit, the information processing apparatus 100 performs an operation of "variable B=(variable B) AND (10 (binary number))" (S210).

With the processing in step S202 or the processing in step S204, and the processing in step S208 or the processing in step S210, the variable B has a value corresponding to the connection state. Thus, the information processing apparatus 100 can detect the connection state of a power supply apparatus to the connection unit by performing the processing shown in FIG. 12. It is needless to say that the connection state detection processing according to an embodiment of the present invention is not limited to the processing shown in FIG. 12.

An example of the processing related to power supply control by the information processing apparatus 100 will be described again with reference to FIG. 11. If the variable B corresponding to the connection state is set in step S102, the information processing apparatus 100 determines whether "variable A≠variable B" holds (S104). Here, that "variable A≠variable B" holds means that the connection state of a power supply apparatus to the first connection unit and/or the second connection unit has changed and that "variable A≠variable B" does not hold means that the connection state in the connection unit does not change. Thus, the processing in step S104 can be considered as insertion/removal determination processing of the first power supply apparatus 200 and/or the second power supply apparatus 300 into/from the information processing apparatus 100.

The information processing apparatus 100 can detect a change of the connection state of a power supply apparatus in the connection unit by the processing in step S102 and the processing in step S104. Thus, the processing in step S102 and the processing in step S104 can be considered as the processing (change determination processing of the connection state) in (1) described above.

If a determination is not made in step S104 that "variable A≠variable B" holds, the information processing apparatus 100 performs processing in step S112 described later.

If a determination is made in step S104 that "variable A≠variable B" holds, the information processing apparatus 100 updates the value of the variable A to "variable A=variable B" (step S106).

FIG. 11 shows an example in which the information processing apparatus 100 performs the processing in step S106 before processing in step S108 and processing in step S110 described later, but the order thereof is not limited to the above example. For example, the information processing apparatus 100 can perform the processing in step S106, the processing in step S108, and the processing in step S110 independently. That is, the information processing apparatus 100 can perform, for example, the processing in step S106 after the processing in step S108 and the processing in step S110, or the processing in step S106, the processing in step S108, and the processing in step S110 synchronously.

The information processing apparatus 100 acquires power supply type information from power supply apparatuses connected to the connection units (S108). Here, the information processing apparatus 100 acquires power supply type information from power supply apparatuses connected to the connection units by, for example, transmitting a power supply type information transmission instruction requesting transmission of power supply type information to the power supply apparatuses via the connection units, but the acquisition method is not limited to the above example. The processing in step S108 corresponds to the processing (acquisition processing of power supply type information) in (2) described above.

When power supply type information is acquired from power supply apparatuses connected to the connection units in step S108, the information processing apparatus 100 updates connected power supply type information (S110). Here, the information processing apparatus 100 updates connected power supply type information by, for example, deleting stored connected power supply identification information and storing new connected power supply identification information based on the acquired power supply type information, but the update method is not limited to the above example. The processing in step S110 corresponds to the processing (management processing of connected power supply identification information) in (3) described above.

If a determination is not made in step S104 that "variable A ≠ variable B" holds or the connected power supply type information is updated in step S110, the information processing apparatus 100 determines the operating state of the information processing apparatus 100 (S112).

Here, the information processing apparatus 100 performs the processing in step S112 by, for example, determining whether the information processing apparatus 100 is in a standby state or in a power saving state, but the method of determination is not limited to the above example. If the information processing apparatus 100 does not exercise power supply control based on the operating state thereof, the information processing apparatus 100 does not have to perform the processing in step S112.

After the operating state is determined in step S112, the information processing apparatus 100 exercises power supply control of power supply apparatuses connected to the connection units based on connected power supply identification information, power supply control information, and the operating state determined in step S112 (S114). Then, the information processing apparatus 100 repeats processing from step S102.

FIG. 11 shows that in the processing in step S114, the information processing apparatus 100 exercises power supply control based on connected power supply identification information, power supply control information, and the operating state, but the processing in step S114 is not limited to the above example. If, for example, the information processing apparatus 100 does not exercise power supply control based on the operating state, the information processing apparatus 100 may exercise power supply control based on connected power supply identification information and power supply control information.

Thus, the processing in step S112 and the processing in step S114, or if the processing in step S112 is not performed, the processing in step S114 corresponds to the processing (power supply control processing) in (4) described above.

The information processing apparatus 100 can realize the processing (change determination processing of the connection state) in (1) to the processing (power supply control processing) in (4) described above by, for example, the processing in FIG. 11. Therefore, the information processing apparatus 100 can exercise power supply control based on the type of connected power supply apparatuses by, for example, the processing in FIG. 11. It is needless to say that the processing related to power supply control by the information processing apparatus 100 according to an embodiment of the present invention is not limited to the processing shown in FIG. 11.

Power Supply Control System According to an Embodiment of the Present Invention

Next, a configuration example of the power supply control system 1000 capable of realizing the above power supply control approach according to an embodiment of the present invention will be described. The configuration in which the power supply control system 1000 according to an embodiment of the present invention has, as shown in FIG. 1, two power supply apparatuses, i.e., the first power supply apparatus 200 and the second power supply apparatus 300, connectible to the information processing apparatus 100 is taken as an example.

[Information Processing Apparatus 100]

Figure 13:
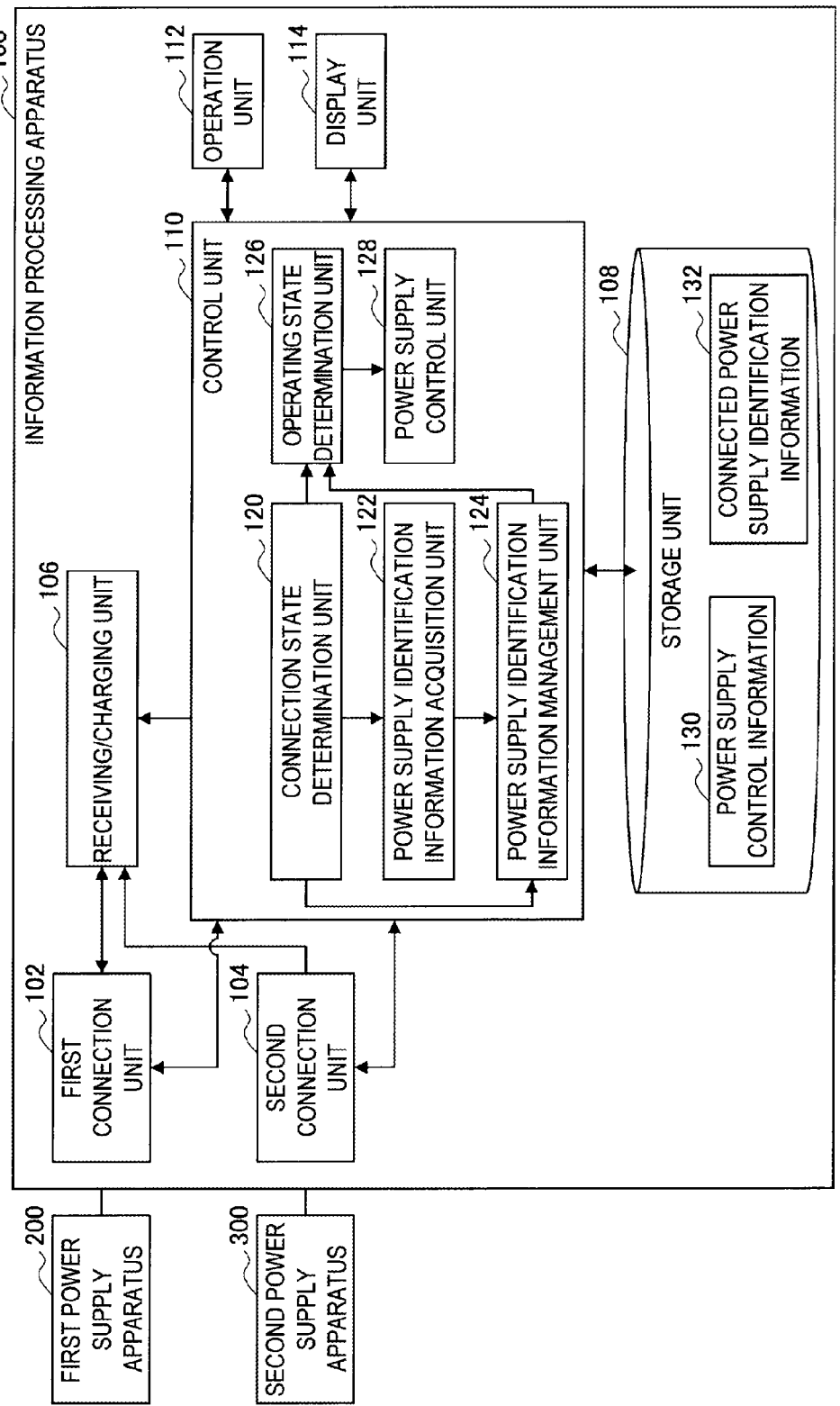
FIG. 13 is a block diagram showing an example of the configuration of the information processing apparatus according to the embodiment of the present invention.

FIG. 13 is a block diagram showing an example of the configuration of the information processing apparatus 100 according to the embodiment of the present invention. Here, FIG. 13 shows a case where the first power supply apparatus 200 and the second power supply apparatus 300 are connected to the information processing apparatus 100. A case where the first power supply apparatus 200 and the second power supply apparatus 300 are connected to the information processing apparatus 100 is taken below as an example.

The information processing apparatus 100 includes a first connection unit 102, a second connection unit 104, a receiving/charging unit 106, a storage unit 108, a control unit 110, an operation unit 112, and a display unit 114.

The information processing apparatus 100 may further include, for example, a ROM (Read Only Memory; not shown), a RAM (Random Access Memory; not shown), and an imaging unit (not shown) for imaging. The information processing apparatus 100 connects each component by, for example, a bus as a transmission path of data.

The ROM (not shown) stores control data such as programs and arithmetic parameters used by the control unit 110. The RAM (not shown) temporarily stores programs executed by the control unit 110.

[Hardware Configuration Example of the Information Processing Apparatus 100]

Figure 14:
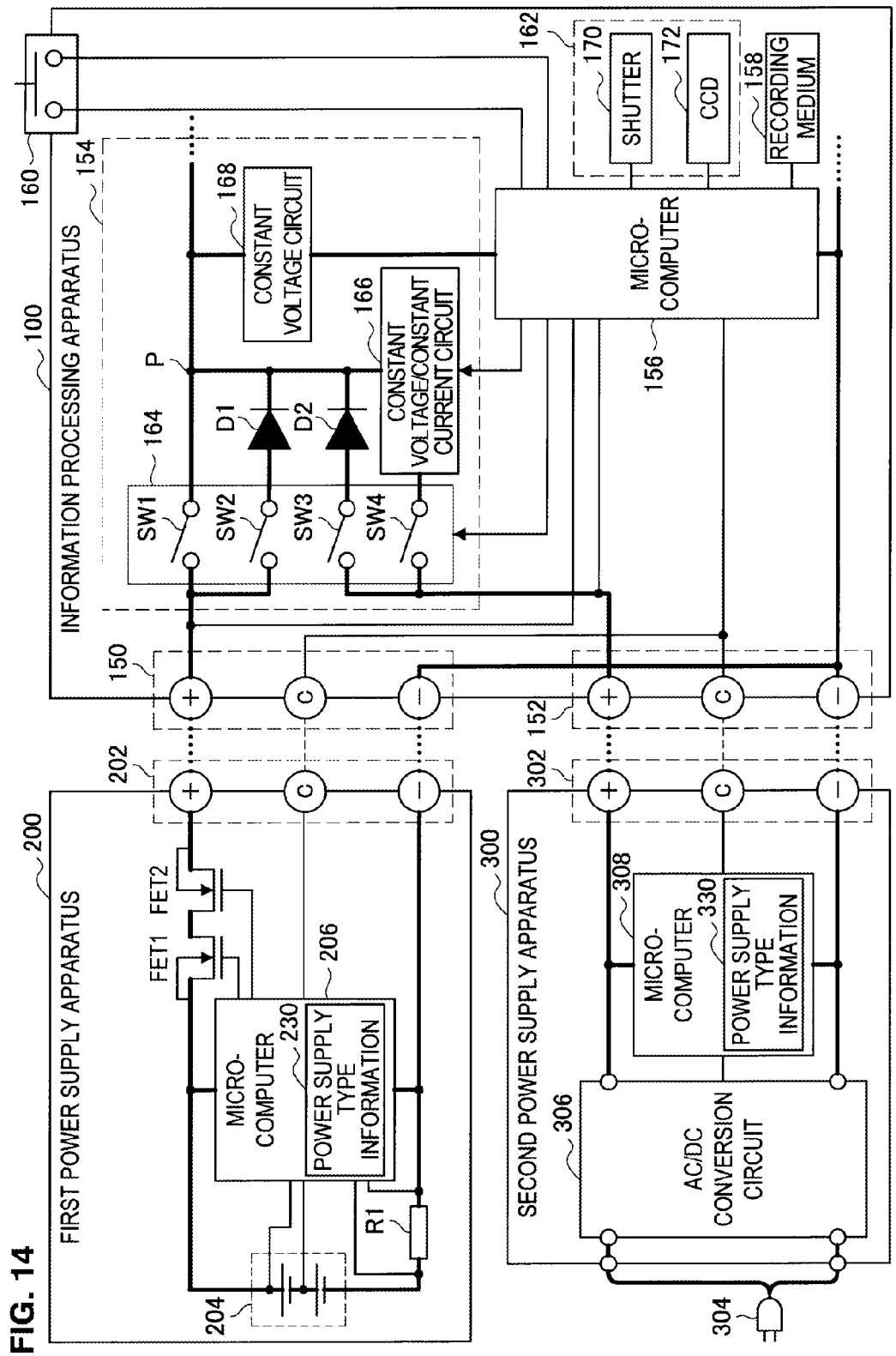
FIG. 14 is an explanatory view showing an example of the hardware configuration of the information processing apparatus according to the embodiment of the present invention.

FIG. 14 is an explanatory view showing an example of the hardware configuration of the information processing apparatus 100 according to the embodiment of the present invention. Here, FIG. 14 shows an example of the hardware configuration when the information processing apparatus 100 is, for example, a digital camera as shown in FIG. 1.

FIG. 14 also shows an example of the hardware configuration of the first power supply apparatus 200 and the second power supply apparatus 300 shown in FIG. 13. Here, in FIG. 14, an example of the hardware configuration when the first power supply apparatus 200 is a secondary battery and the second power supply apparatus 300 is an AC adapter is shown. Examples of the hardware configurations of the first power supply apparatus 200 and the second power supply apparatus 300 will be described later.

The hardware configuration of each of the information processing apparatus 100, the first power supply apparatus 200, and the second power supply apparatus 300 will be described below with reference to the drawings and it is assumed that "+" is a +power supply terminal (hereinafter, may be referred to as a "+terminal"), "−" is a − power supply terminal (hereinafter, may be referred to as a "−terminal"), and "C" is a communication terminal in each drawing.

The information processing apparatus 100 has a first connection circuit 150, a second connection circuit 152, a receiving/charging circuit 154, a microcomputer 156, a recording medium 158, a shutter button 160, and an imaging mechanism 162.

The first connection circuit 150 functions as the first connection unit 102, and the first power supply apparatus 200 is connected to the first connection circuit 150. The first connection circuit 150 has a +terminal and a −terminal for feeding from the first power supply apparatus 200 or charging to the first power supply apparatus 200. The first connection circuit 150 also has a communication terminal to communicate with the first power supply apparatus 200 (to be more precise, a microcomputer 206 described later). Though not shown in FIG. 14, the first connection unit 102 may also have a power supply slot to contain the first power supply apparatus 200 and a mechanism (for example, a mechanical switch) to detect the first power supply apparatus 200.

The second connection circuit 152 functions as the second connection unit 104, and the second power supply apparatus 300 is connected to the second connection circuit 152. The second connection circuit 152 has a + terminal and a −terminal for feeding from the second power supply apparatus 300 and also has a communication terminal to communicate with the second power supply apparatus 300 (to be more precise, a microcomputer 308 described later). Though not shown in FIG. 14, the second connection unit 104 may also have a mechanism (for example, a mechanical switch) to detect the second power supply apparatus 300.

The receiving/charging circuit 154 functions as the receiving/charging unit 106 and plays the role of receiving power from the first power supply apparatus 200 and/or the second power supply apparatus 300 and charging the first power supply apparatus 200. The receiving circuit 154 has a switch circuit 164 having switches SW1 to SW4, diodes D1 and D2, a constant voltage/constant current circuit 166, and a constant voltage circuit 168.

One terminal of each of the switches SW1 to SW4 constituting the switch circuit 164 is connected to the +terminal of the first connection circuit 150 or the +terminal of the second connection circuit 152. The other terminal of each of the switches SW1 to SW3 constituting the switch circuit 164 is connected to a contact point P serving as an UNGER power supply via the diode D1 or the diode D2 or directly. The other terminal of the switch SW4 constituting the switch circuit 164 is connected to the contact point P serving as the UNGER power supply via the constant voltage/constant current circuit 166.

Each of the switches SW1 to SW4 constituting the switch circuit 164 is controlled by the microcomputer 156 and selectively turned ON/OFF in accordance with power receiving or charging. As the control by the microcomputer 156, for example, the switch SW1 is turned OFF and the switch SW2 turned ON when power is received from the first power supply apparatus 200 and the switch SW1 is turned ON and the switch SW2 turned OFF when the first power supply apparatus 200 is charged. Power receiving from the second power supply apparatus 300 is realized by ON/OFF control of the switches SW3 and SW4 by the microcomputer 156.

Each of the switches SW1 to SW4 is composed of, for example, a p-channel type MOSFET (Metal Oxide Semiconductor Field effect transistor) or an n-channel type MOSFET, but the switches are not limited to the above examples.

Based on an output control signal transmitted from the microcomputer 156, the constant voltage/constant current circuit 166 carries out constant-voltage or constant-current output based on input from the switch SW4. With the constant voltage/constant current circuit 166, the information processing apparatus 100 can realize, for example, power supply control as shown in FIGS. 5, 7, 9, and 10.

The constant voltage circuit 168 supplies a power supply obtained by making the UNGER power supply constant to the microcomputer 156.

With the configuration shown in FIG. 14, the receiving/charging circuit 154 can receive power fed from the first power supply apparatus 200 and/or the second power supply apparatus 300 and charge the first power supply apparatus 200.

The microcomputer 156 is configured by a CPU (Central Processing Unit) or an integrated circuit in which a plurality of circuits to realize the control function is integrated and functions as the control unit 110 that controls the whole information processing apparatus 100. The microcomputer 156 can also play the role of a connection state determination unit 120, a power supply identification information acquisition unit 122, a power supply identification information management unit 124, an operating state determination unit 126, or a power supply control unit 128 in the information processing apparatus 100.

Figure 15:
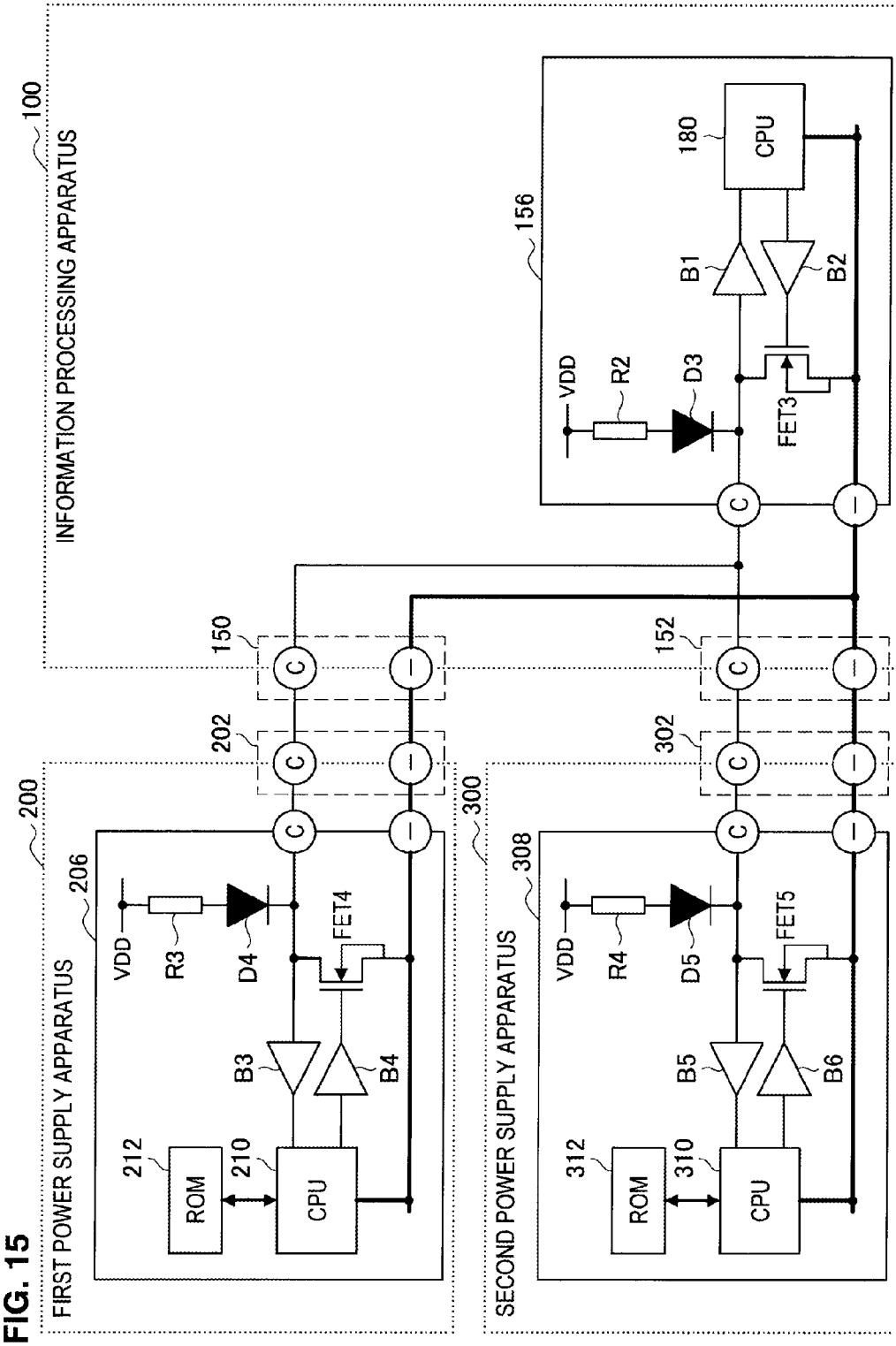
FIG. 15 is an explanatory view showing an example of the hardware configuration of a microcomputer provided in the information processing apparatus according to the embodiment of the present invention.

FIG. 15 is an explanatory view showing an example of the hardware configuration of the microcomputer 156 provided in the information processing apparatus 100 according to the embodiment of the present invention. FIG. 15 shows, among components of the microcomputer 156, components related to communication with the microcomputer 206 of the first power supply apparatus 200 and a microcomputer 308 of the second power supply apparatus 300.

FIG. 15 also shows an example of the hardware configuration of the microcomputer 206 provided in the first power supply apparatus 200 and an example of the hardware configuration of the microcomputer 308 provided in the second power supply apparatus 300. In FIG. 15, of the configuration of the microcomputer 206 and that of the microcomputer 308, only configurations related to communication with the information processing apparatus 100 are shown. The configurations of the microcomputer 206 and the microcomputer 308 will be described later.

The communication terminal of the microcomputer 156 is connected to the communication terminal of the first connection circuit 150 and that of the second connection circuit 152. The microcomputer 156 performs communication with the first power supply apparatus 200 and the second power supply apparatus 300 by selectively switching the signal level (high level/low level) of a signal output from the communication terminal of the microcomputer 156. Moreover, the −terminal of the microcomputer 156 is connected to the −terminal of the first connection circuit 150 and that of the second connection circuit 152.

The communication terminal of the microcomputer 156 is an open drain terminal and is pulled up by a reference voltage VDD via a resistor R2 and a diode D3. The communication terminal of the microcomputer 156 is also connected to a drain terminal of an FET 3 and, via an input buffer B1, to a CPU 180.

The CPU 180 plays a leading role in performing processing related to control of the whole information processing apparatus 100 in the control unit 110 or processing related to power supply control according to an embodiment of the present invention. Moreover, when communication is performed with the connected first power supply apparatus 200 and second power supply apparatus 300 in, for example, the processing (acquisition processing of power supply type information) in (2) described above, the CPU 180 selectively turns ON/OFF the FET 3 by applying a control signal to the gate terminal of the FET 3 via an output buffer B2.

More specifically, when the level of a signal output from the communication terminal of the microcomputer 156 is set to the high level, the CPU 180 applies a control signal of the low level to the gate terminal of the FET 3 via the output buffer B2. The FET 3 is turned OFF by the above operation and a high level signal is output from the communication terminal of the microcomputer 156 by being pulled by the reference voltage VDD via the resistor R2 and the diode D3.

When the level of a signal output from the communication terminal of the microcomputer 156 is set to the low level, the CPU 180 applies a control signal of the high level to the gate terminal of the FET 3 via the output buffer B2. The FET 3 is turned ON by the above operation and a low level signal is output from the communication terminal of the microcomputer 156 by being pulled by the FET 3.

The microcomputer 156 can perform communication with the connected first power supply apparatus 200 and second power supply apparatus 300 by selectively switching the signal level of the communication terminal by adopting the configuration shown in FIG. 15. Moreover, with the CPU 180, the microcomputer 156 can play a leading role performing processing related to control of the whole information processing apparatus 100 or processing related to power supply control according to an embodiment of the present invention.

The configuration related to communication of the microcomputer 156 provided in the information processing apparatus 100 according to an embodiment of the present invention is not limited to the configuration shown in FIG. 15. For example, the microcomputer 156 may further include an encryption circuit and a decryption circuit to perform crypto-communication with the first power supply apparatus 200 and the second power supply apparatus 300. Here, the information processing apparatus 100 and the first power supply apparatus 200 or the second power supply apparatus 300 can perform crypto-communication by various encryption schemes such as the public key system and secret key system, but the encryption scheme is not limited to the above examples.

If the information processing apparatus 100 acquires power supply identification information from each of the first power supply apparatus 200 and the second power supply apparatus 300 through crypto-communication, an occurrence of erroneous recognition of power supply identification information by the information processing apparatus 100 due to communication noise or the like can be prevented. Thus, when the information processing apparatus 100 performs crypto-communication with each of the first power supply apparatus 200 and the second power supply apparatus 300, power supply control based on the type of connected power supply apparatuses can be exercised more reliably even if communication noise is caused by some factor.

An example of the hardware configuration of the information processing apparatus 100 will be described again with reference to FIG. 14. The recording medium 158 functions as the storage unit 108 and stores various kinds of data such as power supply control information, connected power supply identification information, and applications.

Examples of the recording medium 158 include, but are not limited to, a magnetic recording medium such as a hard disk and a nonvolatile memory such as an EEPROM (Electrically Erasable and Programmable Read Only Memory), flash memory, MRAM (Magnetoresistive Random Access Memory), FeRAM (Ferroelectric Random Access Memory), and PRAM (Phase change Random Access Memory). The information processing apparatus 100 can also include the recording medium 158 that is removable from the information processing apparatus 100.

The shutter button 160 functions as the operation unit 112 that can be operated by the user of the information processing apparatus 100. When the shutter button 160 is pressed, an operation signal indicating that the shutter button 160 is pressed is transmitted to the microcomputer 156 and the microcomputer 156 controls the imaging mechanism 162 based on the operation signal to selectively pick up an image using the imaging mechanism 162.

The operation unit 112 according to an embodiment of the present invention is not limited to the shutter button 160 shown in FIG. 14. An operation input device provided on the information processing apparatus 100, for example, a button, direction key, rotational selector such as a jog dial, or a combination of these can function as the operation unit 112. Moreover, it is needless to say that an operation input device (such as a keyboard and mouse) as an external device of the information processing apparatus 100 can play the role of the operation unit 112 according to the embodiment of the present invention.

The imaging mechanism 162 functions as an imaging unit (not shown) that picks up an image and an image pickup is controlled by the microcomputer 156. FIG. 14 shows an example in which the imaging mechanism 162 is constituted by a shutter 170 and a CCD (Charge Coupled Device), but the imaging mechanism 162 is not limited to the above example.

With the configuration shown in, for example, FIG. 14, the information processing apparatus 100 can perform processing concerning the power supply control approach.

Figure 16:
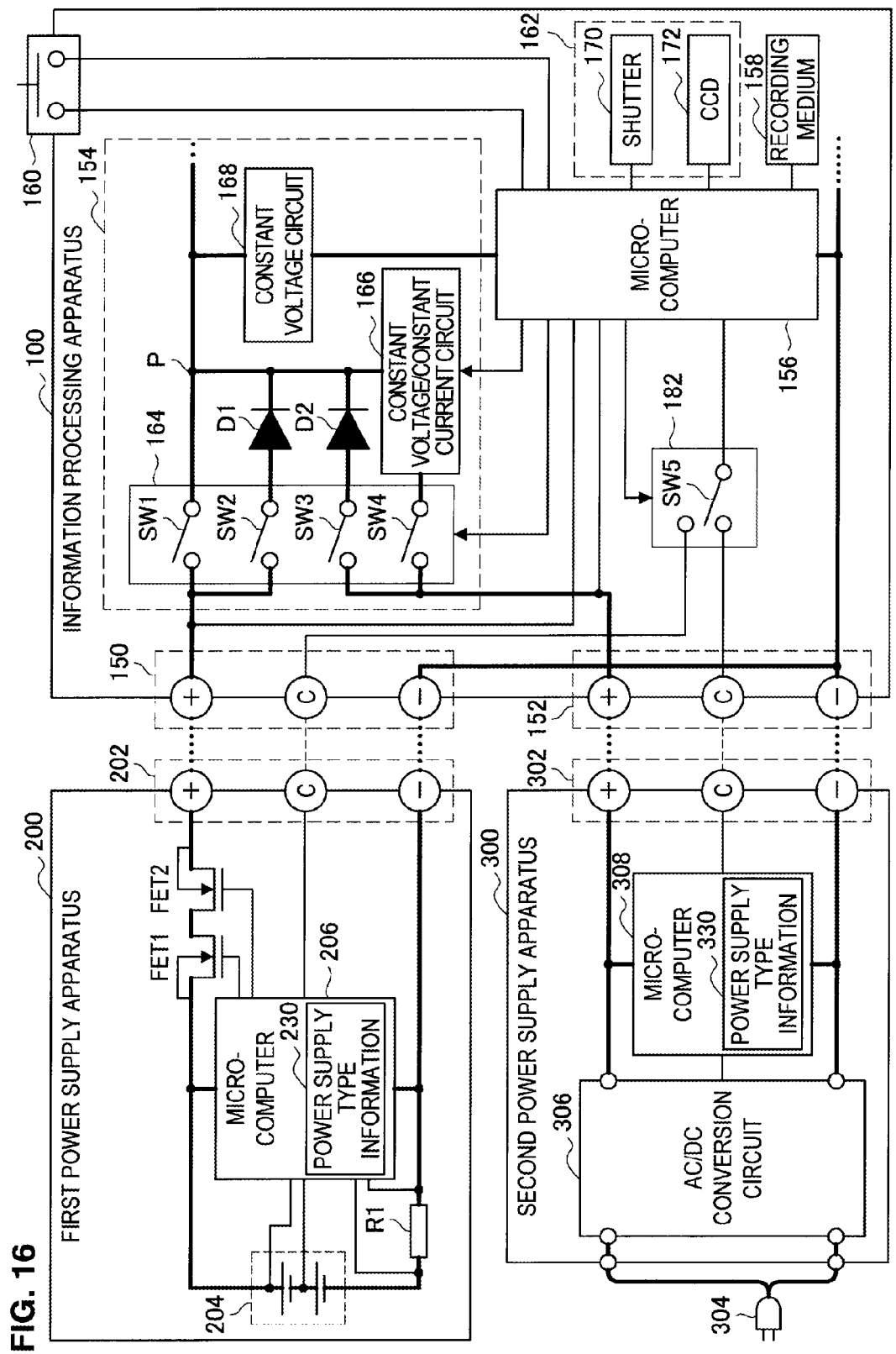
FIG. 16 is an explanatory view showing another example of the hardware configuration of the information processing apparatus according to the embodiment of the present invention.

The hardware configuration of the information processing apparatus 100 according to an embodiment of the present invention is not limited to the configuration shown in FIG. 14. FIG. 16 is an explanatory view showing another example of the hardware configuration of the information processing apparatus 100 according to the embodiment of the present invention. In FIG. 16, like in FIG. 14, an example of the hardware configuration when the information processing apparatus 100 is, for example, a digital camera as shown in FIG. 1 is shown. In FIG. 16, like in FIG. 14, an example of the hardware configuration of the first power supply apparatus 200 and the second power supply apparatus 300 shown in FIG. 13 is also shown.

Comparison of the configuration of the information processing apparatus 100 shown in FIG. 14 with that shown in FIG. 16 shows that the configuration shown in FIG. 16 further includes a switching circuit 184 having a switch SW5. The information processing apparatus 100 shown in FIG. 16 is different from the information processing apparatus 100 shown in FIG. 14 in that communication with the first power supply apparatus 200 and communication with the second power supply apparatus 300 are selectively switched by the switch SW5 being controlled by the microcomputer 156. With the configuration shown in FIG. 16, the information processing apparatus 100 can also communicate with each of the first power supply apparatus 200 and the second power supply apparatus 300.

Except that the switching circuit 184 is further provided, as described above, the information processing apparatus 100 having the configuration shown in FIG. 16 has the same configuration as that shown in FIG. 14. Thus, the information processing apparatus 100 having the configuration shown in FIG. 16 can perform, like a case where the configuration shown in FIG. 14 is provided, processing concerning the power supply control approach.

The hardware configuration of the information processing apparatus 100 according to an embodiment of the present invention is not limited to the configurations shown in FIGS. 14 and 16. For example, the information processing apparatus 100 may include a display device (not shown) having the function as the display unit 114 or a communication interface (nor shown) to perform communication with an external apparatus.

Examples of display device (not shown) according to an embodiment of the present invention include, but are not limited to, a liquid crystal display (LCD) and organic EL display (organic ElectroLuminescence display or also called an OLED display (Organic Light Emitting Diode display)). Incidentally, a display device (such as an external display) as an external apparatus of the information processing apparatus 100 may also play the role of the display unit 114 according to the embodiment of the present invention.

Examples of the communication interface (nor shown) according to an embodiment of the present invention include, but are not limited to, a communication antenna and RF circuit (wireless communication), IEEE802.15.1 port and transmitting/receiving circuit (wireless communication), IEEE802.11b port and transmitting/receiving circuit (wireless communication), and LAN terminal and transmitting/receiving circuit (wire communication).

An example of the configuration of the information processing apparatus 100 will be described again with reference to FIG. 13. The first power supply apparatus 200 is connected to the first connection unit 102. The first connection unit 102 receives power from the first power supply apparatus 200, charges the first power supply apparatus 200, and performs communication with the first power supply apparatus 200 by having, for example, the first connection circuit 150 shown in FIG. 14.

The second power supply apparatus 300 is connected to the second connection unit 104. The second connection unit 104 receives power from the second power supply apparatus 300 and performs communication with the second power supply apparatus 300 by having, for example, the second connection circuit 152 shown in FIG. 14.

The receiving/charging unit 106 plays the roles of receiving power fed from the first power supply apparatus 200 and/or the second power supply apparatus 300 and charging the first power supply apparatus 200. The receiving/charging unit 106 is configured by, for example, the receiving circuit 154 shown in FIG. 14, but the configuration is not limited to the above example.

The storage unit 108 is storage means provided in the information processing apparatus 100. As the storage unit 108, for example, a magnetic recording medium such as a hard disk and a nonvolatile memory such as a flash memory can be cited, but the storage unit 108 is not limited to the above examples.

The storage unit 108 stores various kinds of data such as power supply control information, connected power supply identification information, and applications. FIG. 13 shows an example in which power supply control information 130 and connected power supply identification information 132 are stored in the storage unit 108, but stored data is not limited to the above examples.

The control unit 110 is configured by, for example, a CPU or an integrated circuit in which various processing circuits are integrated and plays the role of controlling the whole information processing apparatus 100. The control unit 110 includes the connection state determination unit 120, the power supply identification information acquisition unit 122, the power supply identification information management unit 124, the operating state determination unit 126, and the power supply control unit 128 and plays a leading role in performing processing concerning the above power supply control approach.

FIG. 13 shows the configuration in which the control unit 110 has the operating state determination unit 126, but the configuration is not limited to the above example. For example, when the information processing apparatus 100 exercises power supply control based on connected power supply identification information and power supply control information for the processing (power supply control processing) in (4) described above, the control unit of the information processing apparatus 100 according to an embodiment of the present invention may not have the operating state determination unit 126. The configuration, as shown in FIG. 13, when the information processing apparatus 100 exercises power supply control based on connected power supply identification information, power supply control information, and the operating state for the processing (power supply control processing) in (4) described above will mainly be described below.

The connection state determination unit 120 plays the role of performing the processing (change determination processing of the connection state) in (1) described above. More specifically, the connection state determination unit 120 determines whether the connection states of the power supply apparatuses have changed based on a detection result of the connection state of the first power supply apparatus 200 to the first connection unit and a detection result of the connection state of the second power supply apparatus 300 to the second connection unit.

The connection state determination unit 120 communicates a determination result to each of the power supply identification information acquisition unit 122, the power supply identification information management unit 124, and the operating state determination unit 126. The connection state determination unit 120 communicates, for example, a flag indicating presence/absence of change in the operating states of the power supply apparatuses to each unit as a determination result, but the communication method is not limited to the above example.

When the control unit of the information processing apparatus 100 according to an embodiment of the present invention does not have the operating state determination unit 126, the connection state determination unit 120 communicates a determination result to each of, for example, the power supply identification information acquisition unit 122, the power supply identification information management unit 124, and the power supply control unit 128.

The power supply identification information acquisition unit 122 plays the role of performing the processing (acquisition processing of power supply type information) in (2) described above. More specifically, if a determination result communicated from the connection state determination unit 120 indicates that the connection state has changed, the power supply identification information acquisition unit 122 acquires power supply type information from the connected power supply apparatuses.

The power supply identification information acquisition unit 122 communicates the acquired power supply type information to the power supply identification information management unit 124.

The power supply identification information management unit 124 plays the role of performing the processing (management processing of connected power supply identification information) in (3) described above. More specifically, if a determination result communicated from the connection state determination unit 120 does not indicate that the connection state has changed, the power supply identification information management unit 124 does not update the connected power supply identification information 132 stored in the storage unit 108. If a determination result communicated from the connection state determination unit 120 indicates that the connection state has changed, the power supply identification information management unit 124 updates the connected power supply identification information 132 stored in the storage unit 108 based on the power supply type information communicated from the power supply identification information acquisition unit 122.

When the update of the connected power supply identification information is completed, the power supply identification information management unit 124 communicates a message indicating that the processing has been completed to the operating state determination unit 126. When the control unit of the information processing apparatus 100 according to an embodiment of the present invention does not have the operating state determination unit 126, the power supply identification information management unit 124 communicates a message indicating that the processing has been completed to the power supply control unit 128.

The operating state determination unit 126 plays the role of performing processing of a portion of the processing (power supply control processing) in (4) described above. More specifically, if a determination result that the connection state has not changed is communicated from the connection state determination unit 120 or a processing result that the processing has completed is communicated from the power supply identification information management unit 124, the operating state determination unit 126 determines the operating state of the information processing apparatus 100. Then, the operating state determination unit 126 communicates a determination result to the power supply control unit 128.

The operating state determination unit 126 according to an embodiment of the present invention can determine the operating state and communicate a determination result to the power supply control unit 128 without depending on communication of a determination result from the connection state determination unit 120 and communication of a processing result from the power supply identification information management unit 124.

The power supply control unit 128 plays a leading role in performing the processing (power supply control processing) in (4) described above. More specifically, the power supply control unit 128 exercises power supply control in accordance with the operating states of connected power supply apparatuses and the information processing apparatus 100 based on the power supply control information 130 and the connected power supply identification information 132 stored in the storage unit 108 and the operating states communicated from the operating state determination unit 126. When the control unit of the information processing apparatus 100 according to an embodiment of the present invention does not have the operating state determination unit 126, the power supply control unit 128 exercises power supply control in accordance with connected power supply apparatuses based on the power supply control information 130 and the connected power supply identification information 132 stored in the storage unit 108.

The control unit 110 can play a leading role in performing processing concerning the above power supply control approach by having, for example, the connection state determination unit 120, the power supply identification information acquisition unit 122, the power supply identification information management unit 124, the operating state determination unit 126, and the power supply control unit 128.

The operation unit 112 is operation means enabling the user to perform operations and provided in the information processing apparatus 100. The information processing apparatus 100 enables user's operations by having the operation unit 112 so that processing desired by the user can be performed in accordance with user's operations. As the operation unit 112, for example, a button, direction key, rotational selector such as a jog dial, or a combination of these can be cited, but the operation unit 112 is not limited to the above examples.

The display unit 114 is display means provided in the information processing apparatus 100 and displays various kinds of information on the display screen. As the screen displayed on the display screen of the display unit 114, for example, another operation screen to cause the information processing apparatus 100 to perform a desired operation can be cited. As the display unit 114, for example, an LCD and organic EL display can be cited, but the display unit 114 is not limited to the above examples. For example, the information processing apparatus 100 can constitute the display unit 114 by a touch screen. In the above case, the display unit 114 functions as an operation/display unit enabling both user's operations and the display.

With the configuration shown in, for example, FIG. 13, the information processing apparatus 100 can realize processing concerning the power supply control approach. Thus, the information processing apparatus 100 can, with the configuration shown in, for example, FIG. 13, exercise power supply control based on the type of connected power supply apparatuses.

The configuration of an information processing apparatus according to an embodiment of the present invention is not limited to the configuration shown in FIG. 13. For example, the information processing apparatus 100 according to an embodiment of the present invention may be configured to include a communication unit (not shown) to perform communication with an external apparatus capable of storing power supply control information and connected power supply identification information without having the storage unit 108.

In the information processing apparatus according to an embodiment of the present invention when the above configuration is adopted, for example, the power supply identification information management unit 124 can update connected power supply identification information stored in the external apparatus via the communication unit (not shown). Also in the information processing apparatus according to an embodiment of the present invention, the power supply control unit 128 can exercise power supply control by acquiring power supply control information and connected power supply identification information from the external apparatus via the communication unit (not shown). Thus, when the above configuration is adopted, the information processing apparatus according to an embodiment of the present invention can realize processing concerning the power supply control approach according to an embodiment of the present invention and therefore, can exercise power supply control based on the type of connected power supply apparatuses.

[First Power Supply Apparatus 200]

Next, the first power supply apparatus 200 will be described. The first power supply apparatus 200 stores, as described above, power supply type information. If the first power supply apparatus 200 is a power supply apparatus capable of feeding and being charged and is connected to the information processing apparatus 100, the first power supply apparatus 200 supplies a power supply to the information processing apparatus 100 or is charged by a charging current controlled by the information processing apparatus 100. If the first power supply apparatus 200 is a power supply apparatus capable of feeding and is connected to the information processing apparatus 100, the first power supply apparatus 200 supplies a power supply to the information processing apparatus 100.

[Hardware Configuration Example of the First Power Supply Apparatus 200]

A hardware configuration example of the first power supply apparatus 200 will be described by taking an example where the first power supply apparatus 200 is a secondary battery capable of feeding and being charged. Referring to FIG. 14, the first power supply apparatus 200 includes a connection circuit 202, a cell 204, the microcomputer 206, a current detection resistor R1, a charging protection FET 1, and a discharging protection FET 2.

The connection circuit 202 functions as a connection unit in the first power supply apparatus 200, and the information processing apparatus 100 is connected to the connection circuit 202. The connection circuit 202 has a +terminal and a −terminal for feeding to the information processing apparatus 100 or charging from the information processing apparatus 100. The connection circuit 202 also has a communication terminal to perform communication with the information processing apparatus 100 (to be more precise, the microcomputer 156).

The cell 204 is a power supply in the first power supply apparatus 200. FIG. 14 shows an example in which the cell 204 is constituted by two cells, but the cell 204 is not limited to the above example. The +pole of the cell 204 is connected to the +terminal of the connection circuit 202 via the FET 1 and the FET 2. The −pole of the cell 204 is connected to the −terminal of the connection circuit 202 via the resistor R1.

The microcomputer 206 is configured by a CPU or an integrated circuit in which a plurality of circuits to realize the control function is integrated and functions as a control unit to control the whole first power supply apparatus 200. The microcomputer 206 stores power supply type information 230. The control exercised by the microcomputer 206 includes, for example, charging/feeding control and communication control with the information processing apparatus 100.

<Example of Charging/Feeding Control>

The microcomputer 206 includes, for example, an AD converter to monitor the total voltage of cells constituting the cell 204 and intermediate voltages between cells constituting the cell 204. If the microcomputer 206 detects an abnormal voltage in the cell 204, the microcomputer 206 turns OFF the FET 1 or the FET 2 to provide charging protection or discharging protection to protect the first power supply apparatus 200 and the information processing apparatus 100.

The microcomputer 206 also measures the voltage at both ends of the resistor R1. If, as a result of measurement, an abnormal voltage is detected, the microcomputer 206 protects the first power supply apparatus 200 and the information processing apparatus 100 by turning OFF the FET 1 or the FET 2.

The microcomputer 206 also estimates the current value based on a difference in potential between both ends of the resistor R1 and grasps the value of accumulated currents in the cell 204 by integrating the estimated current value to manage the cell 204.

The microcomputer 206 exercises charging/feeding control by performing, for example, the above processing. It is needless to say that the charging/feeding control by the microcomputer 206 provided in the first power supply apparatus 200 according to an embodiment of the present invention is not limited to the above example.

<Communication Control>

An example of communication control by the microcomputer 206 will be described with reference to FIG. 15. The communication terminal of the microcomputer 206 is connected to the communication terminal of the connection circuit 202. The microcomputer 206 performs communication with the information processing apparatus 100 by selectively switching the signal level (high level/low level) of a signal output from the communication terminal of the microcomputer 206. The −terminal of the microcomputer 206 is connected to the −terminal of the connection circuit 202.

The communication terminal of the microcomputer 206 is an open drain terminal and is pulled up by the reference voltage VDD via a resistor R3 and a diode D4. The communication terminal of the microcomputer 206 is also connected to the drain terminal of an FET 4 and, via an input buffer B3, to a CPU 210.

The CPU 210 plays a leading role in performing processing related to control of the whole first power supply apparatus 200. When, for example, communication is performed with the connected information processing apparatus 100, the CPU 210 applies a control signal to the gate terminal of the FET 4 via an output buffer B4 to selectively turn ON/OFF the FET 4.

More specifically, when the level of a signal output from the communication terminal of the microcomputer 206 is set to the high level, the CPU 210 applies a control signal of the low level to the gate terminal of the FET 4 via the output buffer B4. The FET 4 is turned OFF by the above operation and a high level signal is output from the communication terminal of the microcomputer 206 by being pulled by the reference voltage VDD via the resistor R3 and the diode D4.

When the level of a signal output from the communication terminal of the microcomputer 206 is set to the low level, the CPU 210 applies a control signal of the high level to the gate terminal of the FET 4 via the output buffer B4. The FET 4 is turned ON by the above operation and a low level signal is output from the communication terminal of the microcomputer 206 by being pulled by the FET 4.

The microcomputer 206 can perform communication with the connected information processing apparatus 100 by selectively switching the signal level of the communication terminal by adopting the configuration shown, for example in FIG. 15. Thus, the microcomputer 206 can transmit the power supply type information 230 stored in a ROM 212 to the information processing apparatus 100 in accordance with reception of a power supply type information transmission instruction transmitted from the information processing apparatus 100.

The configuration related to communication of the microcomputer 206 provided in the first power supply apparatus 200 according to an embodiment of the present invention is not limited to the configuration shown in FIG. 15. For example, the microcomputer 206 may further include an encryption circuit and a decryption circuit to perform cryptocommunication with the information processing apparatus 100.

With the configuration shown in, for example, FIG. 14, when connected to the information processing apparatus 100, the first power supply apparatus 200 can supply a power supply to the information processing apparatus 100 or can be charged by a charging current controlled by the information processing apparatus 100. It is needless to say that the configuration of the first power supply apparatus 200 according to an embodiment of the present invention is not limited to the configuration in FIG. 14.

[Second Power Supply Apparatus 300]

Next, the second power supply apparatus 300 will be described. The second power supply apparatus 300 stores, as described above, power supply type information. When connected to the information processing apparatus 100, the second power supply apparatus 300 supplies a power supply to the information processing apparatus 100.

[Hardware Configuration Example of the Second Power Supply Apparatus 300]

A hardware configuration example of the second power supply apparatus 300 will be described by taking an example where the second power supply apparatus 300 is an AC adapter. Referring to FIG. 14, the second power supply apparatus 300 includes a connection circuit 302, an AC plug 304, an AC/DC conversion circuit 306, and the microcomputer 308.

The connection circuit 302 functions as a connection unit in the second power supply apparatus 300, and the information processing apparatus 100 is connected to the connection circuit 302. The connection circuit 302 has a +terminal and a −terminal for feeding to the information processing apparatus 100. The connection circuit 302 also has a communication terminal to perform communication with the information processing apparatus 100 (to be more precise, the microcomputer 156).

The AC plug 304 is a plug connectible to an outlet of a commercial power supply and can take in an AC voltage (for example, a voltage of 100 [V]). The AC plug 304 is connected to the AC/DC conversion circuit 306.

The AC/DC conversion circuit 306 converts an AC voltage (for example, a voltage of 100 [V]) into a DC voltage. The +side of the AC/DC conversion circuit 306 is connected to the + terminal of the connection circuit 302 and the − side of the AC/DC conversion circuit 306 to the −terminal of the connection circuit 302.

The voltage conversion by the AC/DC conversion circuit 306 is controlled by the microcomputer 308 and, due to the control, the AC/DC conversion circuit 306 outputs a DC voltage such as 8.4 [V] and 4.2 [V].

The microcomputer 308 is configured by a CPU or an integrated circuit in which a plurality of circuits to realize the control function is integrated and functions as the control unit that controls the whole second power supply apparatus 300. The microcomputer 308 stores power supply type information 330. The control exercised by the microcomputer 308 includes, for example, conversion control from AC to DC (Direct Current) by the AC/DC conversion circuit 306 and communication control with the information processing apparatus 100.

<Example of Conversion Control>

Based on, for example, an output control instruction transmitted from the information processing apparatus 100, the microcomputer 308 causes the AC/DC conversion circuit 306 to output a DC voltage in accordance with the output control instruction. The microcomputer 308 also protects the information processing apparatus 100 from an overcurrent by, for example, limiting the DC current output from the AC/DC conversion circuit 306.

The microcomputer 308 exercises conversion control by performing, for example, the above processing. It is needless to say that the conversion control by the microcomputer 308 provided in the second power supply apparatus 300 according to an embodiment of the present invention is not limited to the above example.

<Communication Control>

An example of communication control by the microcomputer 308 will be described with reference to FIG. 15. The communication terminal of the microcomputer 308 is connected to the communication terminal of the connection circuit 302. The microcomputer 308 performs communication with the information processing apparatus 100 by selectively switching the signal level (high level/low level) of a signal output from the communication terminal of the microcomputer 308. The −terminal of the microcomputer 308 is connected to the −terminal of the connection circuit 302.

The communication terminal of the microcomputer 308 is an open drain terminal and is pulled up by the reference voltage VDD via a resistor R4 and a diode D5. The communication terminal of the microcomputer 308 is also connected to the drain terminal of an FET 5 and, via an input buffer B5, to a CPU 310.

The CPU 310 plays a leading role in performing processing related to control of the whole second power supply apparatus 300. When, for example, communication is performed with the connected information processing apparatus 100, the CPU 310 applies a control signal to the gate terminal of the FET 5 via an output buffer B6 to selectively turn ON/OFF the FET 5.

More specifically, when the level of a signal output from the communication terminal of the microcomputer 308 is set to the high level, the CPU 310 applies a control signal of the low level to the gate terminal of the FET 5 via the output buffer B6. The FET 5 is turned OFF by the above operation and a high level signal is output from the communication terminal of the microcomputer 308 by being pulled by the reference voltage VDD via the resistor R4 and the diode D5.

When the level of a signal output from the communication terminal of the microcomputer 308 is set to the low level, the CPU 310 applies a control signal of the high level to the gate terminal of the FET 5 via the output buffer B6. The FET 5 is turned ON by the above operation and a low level signal is output from the communication terminal of the microcomputer 308 by being pulled by the FET 5.

The microcomputer 308 can perform communication with the connected information processing apparatus 100 by selectively switching the signal level of the communication terminal by adopting the configuration shown, for example in FIG. 15. Thus, the microcomputer 308 can transmit the power supply type information 330 stored in a ROM 312 to the information processing apparatus 100 in accordance with reception of a power supply type information transmission instruction transmitted from the information processing apparatus 100.

The configuration related to communication of the microcomputer 308 provided in the second power supply apparatus 300 according to an embodiment of the present invention is not limited to the configuration shown in FIG. 15. For example, the microcomputer 308 may further include an encryption circuit and a decryption circuit to perform cryptocommunication with the information processing apparatus 100.

With the configuration shown in, for example, FIG. 14, when connected to the information processing apparatus 100, the second power supply apparatus 300 can supply a power supply to the information processing apparatus 100. It is needless to say that the configuration of the second power supply apparatus 300 according to an embodiment of the present invention is not limited to the configuration in FIG. 14.

The power supply control system 1000 according to the embodiment of the present invention has, as described above, the information processing apparatus 100, the first power supply apparatus 200, and the second power supply apparatus 300. The information processing apparatus 100 performs the processing (change determination processing of the connection state) in (1) to the processing (power supply control processing) in (4) to exercise power supply control in accordance with the combination of connected power supply apparatuses. Thus, the information processing apparatus 100 can exercise power supply control based on the type of connected power supply apparatuses. Therefore, the power supply control system 1000 capable of exercising power supply control based on the type of connected power supply apparatuses can be realized by having the information processing apparatus 100.

Since the information processing apparatus 100 can exercise power supply control based on the type of connected power supply apparatuses, the power supply control system 1000 having the information processing apparatus 100 can achieve effects shown in (a) to (e) below.

(a) Shortening of the Charging Time Necessary for Charging the First Power Supply Apparatus 200

The information processing apparatus 100 can charge, as shown in, for example, FIG. 5 or 7, the connected first power supply apparatus 200 safely and the second power supply apparatus 300 charges the first power supply apparatus 200 with the maximum charging current that can be fed. Thus, the information processing apparatus 100 can safely shorten the charging time necessary for charging the first power supply apparatus 200 connected to the information processing apparatus 100.

(b) Performance Improvement of the Information Processing Apparatus 100

The information processing apparatus 100 can exercise power supply control in accordance with connected power supply apparatuses and thus can perform processing at maximum power that can be supplied by the power supply apparatuses. Thus, the information processing apparatus 100 can perform processing at the maximum performance in accordance with connected power supply apparatuses.

(c) Cost Reduction for the Second Power Supply Apparatus 300

The information processing apparatus 100 can exercise power supply control in accordance with connected power supply apparatuses and thus, the second power supply apparatus 300 does not have to support charging of all types of batteries (example of the first power supply apparatus 200) that can be connected to the information processing apparatus 100. Thus, the cost of the second power supply apparatus 300 can further be reduced by using the power supply control system 1000.

(d) Safety Improvement when Charging the Second Power Supply Apparatus 300

The information processing apparatus 100 can exercise power supply control in accordance with connected power supply apparatuses and, for example, whether the connected second power supply apparatus 300 is a primary battery or a secondary battery can be determined. Thus, if the connected second power supply apparatus 300 is, for example, a primary battery, the information processing apparatus 100 can prevent liquid leakage or degradation of the second power supply apparatus 300 by not charging the second power supply apparatus 300. Therefore, the information processing apparatus 100 can improve safety when charging the second power supply apparatus 300.

The information processing apparatus 100 can, as shown in FIG. 3 or 6, uniquely identify the maximum charging current value of the connected second power supply apparatus 300. Thus, the information processing apparatus 100 can charge the second power supply apparatus 300 with a current corresponding to the connected second power supply apparatus 300, thereby improving the safety in charging the second power supply apparatus 300.

(e) Suppression of Degradation of the Second Power Supply Apparatus 300

The information processing apparatus 100 can charge the second power supply apparatus 300 with a current corresponding to the connected second power supply apparatus 300 and thus, if the second power supply apparatus 300 is, for example, a secondary battery, an increase in internal impedance of the second power supply apparatus 300 can be suppressed. Therefore, the information processing apparatus 100 can attempt to suppress degradation of the second power supply apparatus 300.

The information processing apparatus 100 exercises power supply control based on power supply control information as shown in, for example, FIG. 2. Thus, if, as shown in, for example, FIG. 2, the second power supply apparatus 300 is not connected or the second power supply apparatus 300 that is not to be controlled is connected, it is possible for the information processing apparatus 100 not to charge the first power supply apparatus 200. Therefore, the information processing apparatus 100 can attempt to suppress degradation of the second power supply apparatus 300.

In the foregoing, the information processing apparatus 100 has been taken as a component constituting the power supply control system 1000 according to an embodiment of the present invention, but the embodiment of the present invention is not limited to such a configuration. The embodiment of the present invention can be applied to various devices, for example, a computer such as a PC and PDA (Personal Digital Assistant), imaging apparatus such as a digital camera, mobile communication apparatus such as a mobile phone and PHS (Personal Handyphone System), video/music reproducing apparatus, video/music recording and reproducing apparatus, portable game machine, and transport equipment such as an automobile.

The first power supply apparatus 200 has been taken as a component constituting the power supply control system 1000 according to an embodiment of the present invention, but the embodiment of the present invention is not limited to such a configuration. The embodiment of the present invention can be applied to various power supply apparatuses capable of feeding, or feeding and charging, for example, a secondary battery such as a lithium ion secondary battery and lithium ion polymer secondary battery and a primary battery.

The second power supply apparatus 300 has been taken as a component constituting the power supply control system 1000 according to an embodiment of the present invention, but the embodiment of the present invention is not limited to such a configuration. The embodiment of the present invention can be applied to various power supply apparatuses capable of feeding, for example, an AC adapter, solar cell, fuel cell, external battery (for example, an external primary battery or secondary battery), and hand generator.

(Program According to an Embodiment of the Present Invention)

Power supply control based on the type of connected power supply apparatuses can be exercised by a program that causes a computer to function as an information processing apparatus according to an embodiment of the present invention.

It should be understood by those skilled in the art that various modifications, combinations, sub-combinations and alterations may occur depending on design requirements and other factors insofar as they are within the scope of the appended claims or the equivalents thereof.

In the information processing apparatus 100 shown in, for example, FIG. 13, the configuration in which the control unit 110 includes the connection state determination unit 120, the power supply identification information acquisition unit 122, the power supply identification information management unit 124, the operating state determination unit 126, and the power supply control unit 128 is shown, but the configuration of the information processing apparatus according to an embodiment of the present invention is not limited to the above configuration. For example, the information processing apparatus according to an embodiment of the present invention may individually include any of components of the connection state determination unit 120, the power supply identification information acquisition unit 122, the power supply identification information management unit 124, the operating state determination unit 126, and the power supply control unit 128 (for example, realize each by individual processing circuits).

The above description showed that a program (computer program) causing a computer to function as the information processing apparatus according to an embodiment of the present invention is provided and the embodiment of the present invention can further provide a recording medium storing the program.

It should be appreciated that the arrangements described above only represent exemplary embodiments of the present invention, and that the arrangements are embraced in the technical scope of the present invention.

The present application contains subject matter related to that disclosed in Japanese Priority Patent Application JP 2009-252208 filed in the Japan Patent Office on Nov. 2, 2009, the entire content of which is hereby incorporated by reference.

What is claimed is:

1. An information processing apparatus comprising:
   a first connection unit to connect a first power supply apparatus capable of feeding power or of feeding power and charging, the first power supply apparatus storing power supply type information that indicates a type of the first power supply apparatus;
   a second connection unit to connect a second power supply apparatus capable of feeding power, the second power supply apparatus storing power supply type information that indicates a type of the second power supply apparatus;
   a connection state determination unit to determine, based at least in part on a first connection state of the first connection unit to the first power supply apparatus and a second connection state of the second connection unit to the second power supply apparatus, whether the connection states of the first and second connection units have changed;
   a power supply identification information acquisition unit to selectively acquire the power supply type information from the first power supply apparatus connected to the first connection unit and from the second power supply apparatus connected to the second connection unit if the connection state determination unit determines that the connection states have changed;
   a power supply identification information management unit to manage, based at least in part on a determination result from the connection state determination unit and power supply type information selectively acquired by the power supply identification information acquisition unit, connected-power-supply identification information that indicates the type of the first power supply apparatus connected to the first connection unit and/or the type of the second power supply apparatus connected to the second connection unit; and a power supply control unit to control, based on the connected-power-supply identification information and power supply control information that defines processing depending on the types of the power supply apparatuses connected to the first and second connection units, a feed from the power supply apparatuses connected to the first and second connection units and a charge on the first power supply apparatus connected to the first connection unit.

2. The information processing apparatus according to claim 1, wherein the power supply control information includes information about a maximum charging current of the first power supply apparatus and information about a maximum feeding current of the second power supply apparatus and wherein, when the connected-power-supply identification information indicates that both the first and second power supply apparatuses are connected, the power supply control unit charges the first power supply apparatus with a current having an upper limit value set to a lower of a maximum charging current value indicated in the information about the maximum charging current corresponding to the connected power supply identification information and a maximum feeding current value indicated in the information about the maximum feeding current corresponding to the connected power supply identification information.

3. The information processing apparatus according to claim 2, wherein, when the information, which is included in the power supply control information, about the maximum charging current of the first power supply apparatus corresponding to the connected power supply identification information indicates that the maximum charging current value is variable, the power supply control unit:

periodically or non-periodically acquires the information about the maximum charging current from the first power supply apparatus connected to the first connection unit, and charges the first power supply apparatus with a current having an upper limit value set to a lower of the maximum charging current value indicated in the acquired information about the maximum charging current and the maximum feeding current value indicated in the information about the maximum feeding current corresponding to the connected power supply identification information.

4. The information processing apparatus according to claim 1, further comprising an operating state determination unit to determine an operating state of the information processing apparatus, wherein the power supply control unit controls, based at least further in part on the determination result from the operating state determination unit, the feed from the power supply apparatuses connected to the first and second connection units and the charge on the first power supply apparatus connected to the first connection unit.

5. A power supply control method comprising the steps of:

determining, based at least in part on a first connection state of a first connection unit to a first power supply apparatus and a second connection state of a second connection unit to a second power supply apparatus, whether the connection states of the first and second connection units have changed, the first connection unit being connectable to the first power supply apparatus capable of feeding power or of feeding power and charging, the first power supply apparatus storing power supply type information that indicates a type of the first power supply apparatus, the second connection unit being connectable to the second power supply apparatus capable of feeding power, the second power supply apparatus storing power supply type information that indicates a type of the second power supply apparatus;

selectively acquiring the power supply type information from the first power supply apparatus connected to the first connection unit and from the second power supply apparatus connected to the second connection unit if the connection states are determined, in the step of determining, to have changed;

managing, based at least in part on a determination result from the step of determining and power supply type information selectively acquired in the step of acquiring, connected-power-supply identification information that indicates the type of the first power supply apparatus connected to the first connection unit and/or the type of the second power supply apparatus connected to the second connection unit; and controlling, based at least in part on the connected-power-supply identification information and power supply control information that defines processing depending on the types of the power supply apparatuses connected to the first and second connection units, a feed from the power supply apparatuses connected to the first and second connection units and a charge on the first power supply apparatus connected to the first connection unit.

6. A program for causing a computer to execute the steps of:

determining, based at least in part on a first connection state of a first connection unit to a first power supply apparatus and a second connection state of a second connection unit to a second power supply apparatus, whether the connection states of the first and second connection units have changed, the first connection unit being connectable to the first power supply apparatus capable of feeding power or of feeding power and charging, the first power supply apparatus storing power supply type information that indicates a type of the first power supply apparatus, the second connection unit being connectable to the second power supply apparatus capable of feeding power, the second power supply apparatus storing power supply type information that indicates a type of the second power supply apparatus;

selectively acquiring the power supply type information from the first power supply apparatus connected to the first connection unit and from the second power supply apparatus connected to the second connection unit if the connection states are determined, in the step of determining, to have changed;

managing, based at least in part on a determination result from the step of determining and power supply type information selectively acquired in the step of acquiring, connected-power-supply identification information that indicates the type of the first power supply apparatus connected to the first connection unit and/or the type of the second power supply apparatus connected to the second connection unit; and controlling, based at least in part on the connected-power-supply identification information and power supply control information that defines processing depending on the types of the power supply apparatuses connected to the first and second connection units, a feed from the power supply apparatuses connected to the first and second connection units and a charge on the first power supply apparatus connected to the first connection unit.

7. A power supply control system comprising:

a first power supply apparatus capable of feeding power or of feeding power and charging, storing power supply type information that indicates a type of the first power supply apparatus;

a second power supply apparatus capable of feeding power and, storing power supply type information that indicates a type of the second power supply apparatus; and an information processing apparatus connectable to the first power supply apparatus and/or the second power supply apparatus to control a feed from the connected first and/or second power supply apparatus and a charge on the first power supply apparatus, wherein the information processing apparatus includes a first connection unit connected to the first power supply apparatus;

a second connection unit connected to the second power supply apparatus;

a connection state determination unit for determining, based at least in part on a first connection state of the first connection unit to the first power supply apparatus and a second connection state of the second connection unit to the second power supply apparatus, whether the connection states of the first and second connection units have changed;

a power supply identification information acquisition unit to selectively acquire the power supply type information from the first power supply apparatus connected to the first connection unit and from the second power supply apparatus connected to the second connection unit if the connection state determination unit determines that the connection states have changed;

a power supply identification information management unit to manage, based at least in part on a determination result from the connection state determination unit and power supply type information selectively acquired by the power supply identification information acquisition unit, connected-power-supply identification information that indicates the type of the first power supply apparatus connected to the first connection unit and/or the type of the second power supply apparatus connected to the second connection unit; and a power supply control unit to control, based at least in part on the connected-power-supply identification information and power supply control information that defines processing depending on the types of the power supply apparatuses connected to the first and second connection units, a feed from the power supply apparatuses connected to the first and second connection units and a charge on the first power supply apparatus connected to the first connection unit.

\* \* \* \* \*